United States Patent
Saggu

(10) Patent No.: US 12,142,061 B2
(45) Date of Patent: *Nov. 12, 2024

(54) AMBIGUOUS LANE DETECTION EVENT MINER

(71) Applicant: PlusAI, Inc., Santa Clara, CA (US)

(72) Inventor: Inderjot Singh Saggu, Cupertino, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/082,535

(22) Filed: Dec. 15, 2022

(65) Prior Publication Data

US 2023/0419688 A1 Dec. 28, 2023

Related U.S. Application Data

(63) Continuation of application No. 17/850,648, filed on Jun. 27, 2022, now Pat. No. 11,551,459.

(51) Int. Cl.
*G06V 20/56* (2022.01)
*B60W 60/00* (2020.01)
(Continued)

(52) U.S. Cl.
CPC .......... *G06V 20/588* (2022.01); *G06V 10/764* (2022.01); *G06V 10/774* (2022.01);
(Continued)

(58) Field of Classification Search
CPC .. G06V 20/588; G06V 10/764; G06V 10/774; G06V 20/70; B60W 60/001; B60W 2420/42; B60W 2552/53
See application file for complete search history.

(56) References Cited

U.S. PATENT DOCUMENTS 5,555,312 A * 9/1996 Shima .................. G06V 20/588
382/104
7,403,219 B2 * 7/2008 Miyashita ............ G06V 20/588
348/148
(Continued)

FOREIGN PATENT DOCUMENTS

CN 111095291 A * 5/2020 .......... G05D 1/0088
EP 3567518 A1 11/2019
(Continued)

OTHER PUBLICATIONS

Translation of CN-111095291-A, 49 pages (Year: 2020).*
(Continued)

*Primary Examiner* — Dale W Hilgendorf
(74) *Attorney, Agent, or Firm* — Morgan, Lewis & Bockius LLP

(57) ABSTRACT

A computer system obtains a plurality of road images captured by one or more cameras attached to one or more vehicles. The one or more vehicles execute a model that facilitates driving of the one or more vehicles. For each road image of the plurality of road images, the computer system determines, in the road image, a fraction of pixels having an ambiguous lane marker classification. Based on the fraction of pixels, the computer system determines whether the road image is an ambiguous image for lane marker classification. In accordance with a determination that the road image is an ambiguous image for lane marker classification, the computer system enables labeling of the image and adds the labeled image into a corpus of training images for retraining the model.

20 Claims, 13 Drawing Sheets

(51) Int. Cl.
*G06V 10/764* (2022.01)
*G06V 10/774* (2022.01)
*G06V 20/70* (2022.01)

(52) U.S. Cl.
CPC .......... *G06V 20/70* (2022.01); *B60W 60/001* (2020.02); *B60W 2420/403* (2013.01); *B60W 2552/53* (2020.02)

(56) References Cited

U.S. PATENT DOCUMENTS

| | | | | |
|---|---|---|---|---|
| 11,275,956 | B2* | 3/2022 | Machii | G06V 20/588 |
| 11,551,459 | B1* | 1/2023 | Saggu | G06V 20/70 |
| 11,574,462 | B1* | 2/2023 | Bhatia | G06T 3/60 |
| 2012/0072080 | A1* | 3/2012 | Jeromin | G06V 10/143 |
| | | | | 701/49 |
| 2015/0278612 | A1* | 10/2015 | Sakamoto | G06V 10/60 |
| | | | | 701/41 |
| 2015/0294163 | A1* | 10/2015 | Sakamoto | G06T 7/136 |
| | | | | 382/103 |
| 2015/0324661 | A1* | 11/2015 | Smith | G06V 10/50 |
| | | | | 382/164 |
| 2015/0348275 | A1* | 12/2015 | Kumano | G06T 7/13 |
| | | | | 382/199 |
| 2015/0379361 | A1* | 12/2015 | Boulanger | H04N 5/33 |
| | | | | 701/2 |
| 2017/0140245 | A1* | 5/2017 | Kraft | G06V 20/13 |
| 2018/0373263 | A1* | 12/2018 | Gray | G06V 20/58 |
| 2019/0347491 | A1* | 11/2019 | Kurian | G06F 18/241 |
| 2019/0370566 | A1* | 12/2019 | Su | G06V 20/588 |
| 2020/0125860 | A1* | 4/2020 | Hyun | G06V 20/56 |
| 2020/0151865 | A1* | 5/2020 | Sota | G06T 7/0002 |
| 2020/0218908 | A1* | 7/2020 | Lee | G06V 10/82 |
| 2021/0209941 | A1* | 7/2021 | Maheshwari | G06V 10/7715 |

FOREIGN PATENT DOCUMENTS

| | | | | |
|---|---|---|---|---|
| JP | 5868586 | B2 * | 2/2016 | G08G 1/16 |
| WO | WO-2019172059 | A1 * | 9/2019 | G06T 7/13 |

OTHER PUBLICATIONS

Translation of JP-5868586-B2, 26 pages (Year: 2016).*
Translation of WO-2019172059-A1, 16 pages (Year: 2019).*
Suggu, Office Action, U.S. Appl. No. 17/850,648, Aug. 23, 2022, 32 pgs.
Suggu, Notice of Allowance, U.S. Appl. No. 17/850,648, Oct. 20, 2022, 10 pgs.

* cited by examiner (A)

822 For each road image of the plurality of road images, determine, based on the fraction of pixels, whether the road image is an ambiguous image for lane marker classification.

824 Initialize a total lane pixel count to zero

826 Initialize an ambiguous lane pixel count to zero.

828 For each pixel of the plurality of pixels in the respective road image, determine a class that has a highest probability.

830 In accordance with a determination that the class that has the highest probability belongs to a predefined subset of the classes, increment a total lane pixel count.

832 The predefined subset of classes includes: the dashed lane marker class, the solid lane marker class, and the curb marker class.

834 In accordance with a determination that the highest probability is within a predetermined range of values from a first threshold value, increment the ambiguous lane pixel count.

836 In accordance with a determination that the class that has the highest probability belongs to a predefined subset of the classes, ignore the pixel if the highest probability does not meet the first threshold value.

838 Determine a ratio of the ambiguous lane pixel count to the total lane pixel count.

840 In accordance with a determination that the ratio is above a second threshold value, determine that the road image is an ambiguous image for lane marker classification.

842 For each road image of the plurality of road images, in accordance with a determination that the road image is an ambiguous image for lane marker classification, label the image and add the labeled image into a corpus of training images for retraining the model.

844 Receive user input for the labeling.

846 Retrain the model using machine learning.

848 The model comprises an autonomous driving model. Retraining the model includes modifying the autonomous driving model based at least in part on the added labeled images such that the one or more vehicles can be driven at least partially autonomously using the autonomous driving model.

850 Each labeled image includes information identifying one or more lane markers in the respective labeled image and/or information identifying one or more lanes in the respective labeled image.

852 Transmit the labeled image to a remote server to be added to the corpus of training images.

854 After the retraining, distribute the modified autonomous driving model to the one or more vehicles, including a first vehicle. The modified autonomous driving model is configured to process road images captured by the first vehicle to facilitate at least partially autonomously driving the first vehicle.

Figure 8C

AMBIGUOUS LANE DETECTION EVENT MINER

RELATED APPLICATION

This application is a Continuation of U.S. patent application Ser. No. 17/850,648, filed Jun. 27, 2022, entitled "AMBIGUOUS LANE DETECTION EVENT MINER", now U.S. Pat. No. 11,551,459, issued on Jan. 10, 2023, which is incorporated by reference herein in its entirety.

TECHNICAL FIELD

The present application generally relates to vehicle technology, and more particularly to computer-aided methods and systems for at least partial autonomous vehicle control.

BACKGROUND

Modern vehicles are now capable of self-driving with different levels of autonomy. Each of these levels are characterized by the varying amount of human and/or autonomous control. For example, the Society of Automotive Engineers (SAE) defines 6 levels of driving automation ranging from 0 (fully manual) to 5 (fully autonomous). These levels have been adopted by the U.S. Department of Transportation.

Autonomous vehicles have numerous advantages, including lowering the number of vehicles on the roads (most privately owned vehicles are driven a small fraction of the time); promising more predictable and safer driving behavior than human driven vehicles; emitting less emissions if more vehicles are electrically powered; providing improved fuel efficiency; providing increased lane capacity; providing shorter travel times; allowing mobility for users who are incapable of diving; etc. One of the key obstacles facing the autonomous vehicle industry, however, is the complexity and unpredictability of road and traffic conditions. This makes it difficult to train autonomous vehicles for every possible rare condition or event that the vehicle may encounter while driving (so-called edge cases). For example, occasionally, human drivers may need to react to extraordinary or rare events, such as a package falling off a truck, a lane closure, or something even rarer, like an aircraft making an emergency landing on the freeway. In these situations, human drivers are often able to instinctively react to avoid harm to themselves and their vehicle, but unless the autonomous driving model has been trained for such a rare event, the vehicle may not know how to react.

SUMMARY

Currently, fleet operators often collect large amounts of data from individual vehicles in order to learn from existing road and traffic conditions. Typically, this data is sent from the vehicles to a remote server for storage and analysis (e.g., at a later time). Transmitting such large amounts of data (e.g., HD video or LIDAR data) from many vehicles (e.g., over a cellular data network) consumes valuable communication bandwidth and is prohibitively expensive. Furthermore, a lot of the data may be repetitive, typical, and do not represent rare events from which autonomous driving models can learn.

Accordingly, there is a need for improved systems, methods, and devices that provide a more efficient mechanism for collecting, monitoring, and learning from road condition data captured by a fleet of vehicles, such as data pertaining to lane markers (e.g., lane markings).

The present disclosure describes an improved system and method for lane marker detection for vehicle driving. In accordance with some embodiments disclosed herein, a computer system (e.g., an event miner) determines a ratio of pixels having an ambiguous lane marker classification in a road image collected by a vehicle, identifies "interesting events" associated with lane marker detection in the road image, and determines whether the road image is an ambiguous image for lane marker classification. In accordance with a determination that the road image is an ambiguous image for lane marker classification, the computer system enables labeling of the image and adds the labeled image into a corpus of training images for retraining a model for autonomous driving.

As disclosed herein, in some embodiments, the labeled image includes information identifying one or more lane markers (e.g., locations of the lane markers) in the respective labeled image. In some embodiments, the labeled image includes information identifying one or more lanes in the respective labeled image.

As disclosed herein, in some embodiments, retraining the model includes modifying an autonomous driving model based at least in part on the added labeled images (e.g., and the ambiguous image) such that the one or more vehicles can be driven at least partially autonomously using the autonomous driving model.

Accordingly, the systems and/or methods disclosed herein advantageously improve the autonomous driving models. For example, adding labeled image into an existing corpus of training images expands the training dataset. The labeled images, which include information identifying one or more lane markers, include ground truth of the respective ambiguous images. Retraining the model using the labeled images enables the retrained mode to recognize lane markers in images that would otherwise be ambiguous images, thereby improving performance of the model. Availability of the ground truth enables partially supervised learning to be performed. Furthermore, the event miner flags a subset, and not all, of targeted data corresponding to interesting events, and a reduced volume of targeted data is collected and stored, thereby leading to bandwidth and cost savings.

In accordance with some embodiments, a method for lane marker detection for vehicle driving is performed at a computer system. The computer system includes one or more processors and memory. The method includes obtaining a plurality of road images captured by one or more cameras attached to one or more vehicles. The one or more vehicles are configured to execute a model that facilitates driving of the one or more vehicles. The method further includes, for each road image of the plurality of road images, determining, in the road image, a fraction of pixels having an ambiguous lane marker classification. The method further includes based on the fraction of pixels, determining whether the road image is an ambiguous image for lane marker classification. The method further includes, in accordance with a determination that the road image is an ambiguous image for lane marker classification, enabling labeling of the image and adding the labeled image into a corpus of training images for retraining the model.

According to another aspect of the present application, a computer system includes one or more processors and memory. The memory stores one or more programs configured for execution by the one or more processors. The programs, when executed by the one or more processors, cause the computer system to perform the method for lane marker detection for vehicle driving as described above.

According to another aspect of the present application, a non-transitory computer readable storage medium stores a plurality of programs configured for execution by a computer system having one or more processors and memory, a plurality of sensors, and a vehicle control system (e.g., further including a plurality of actuators). The programs, when executed by the one or more processing units, cause the computer system to perform the method for lane marker detection for vehicle driving as described above.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF DRAWINGS

The accompanying drawings, which are included to provide a further understanding of the embodiments and are incorporated herein and constitute a part of the specification, illustrate the described embodiments and together with the description serve to explain the underlying principles.

FIGS. 8A to 8C is a flow diagram of a method for lane marker detection for vehicle driving, in accordance with some embodiments Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
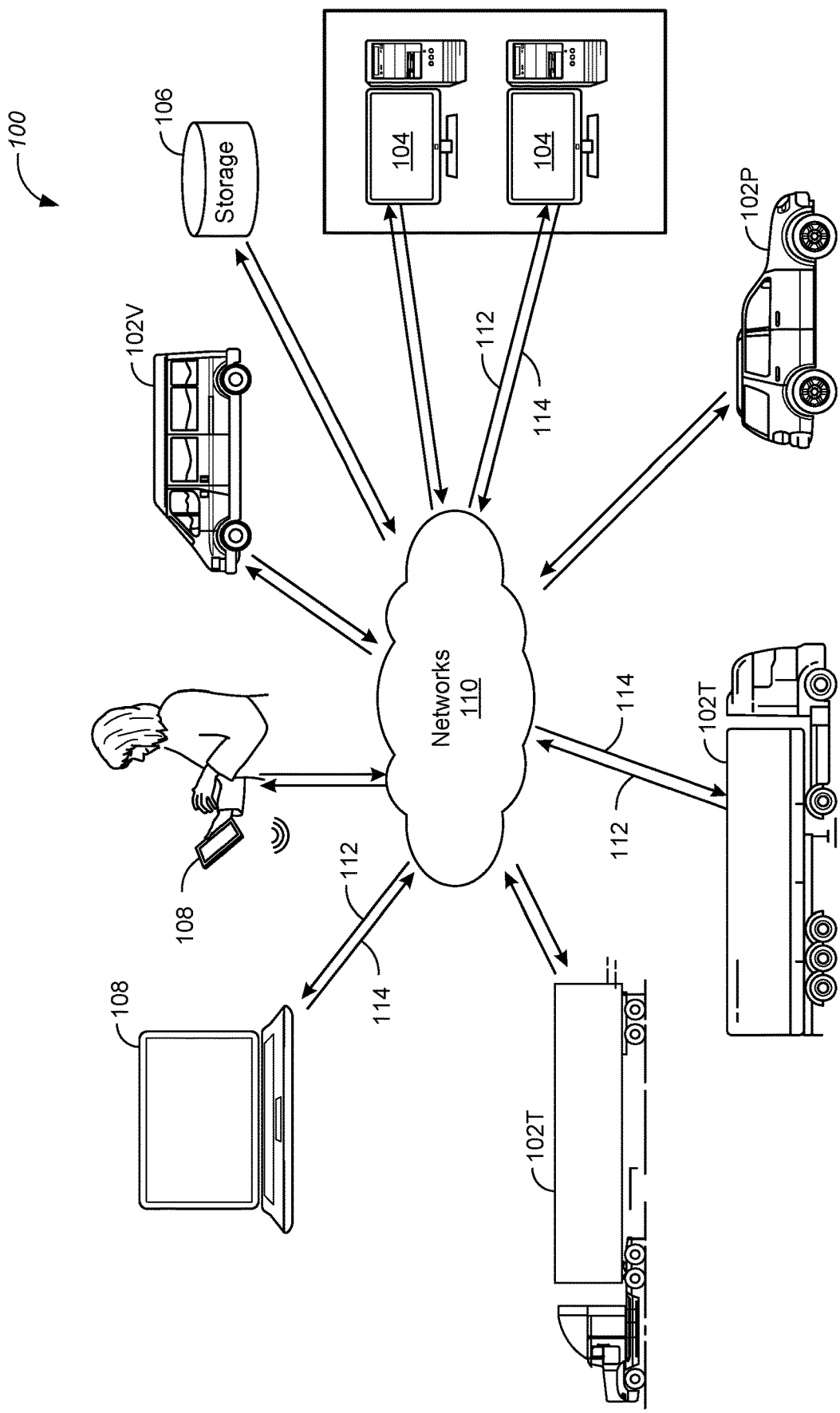
FIG. 1 is an example vehicle driving environment for a plurality of vehicles, in accordance with some embodiments.

FIG. 1 is an example vehicle driving environment 100 having a plurality of vehicles 102, in accordance with some embodiments. Each vehicle 102 has one or more processors, memory, a plurality of sensors, and a vehicle control system, and is configured to sense the vehicle driving environment 100 and drive on roads having different road conditions. The plurality of vehicles 102 may be, for example, passenger cars 102P (e.g., sport-utility vehicles and sedans), vans 102V, trucks 102T, and driver-less cars. Each vehicle 102 can collect sensor data or user inputs, execute user applications, present outputs on its user interface, and/or operate the vehicle control system to drive the vehicle 102. The collected data or user inputs can be processed locally (e.g., for training and/or for prediction) at the vehicle 102 and/or remotely by server(s) 104. The one or more servers 104 provide system data (e.g., boot files, operating system images, and user applications) to the vehicle 102, and in some embodiments, process the data and user inputs received from the vehicle 102 when the user applications are executed on the vehicle 102. In some embodiments, the vehicle driving environment 100 further includes storage 106 for storing data related to the vehicles 102, servers 104, and applications executed on the vehicles 102.

For each vehicle 102, the plurality of sensors includes one or more of a global positioning system (GPS) sensors, a light detection and ranging (LiDAR) scanner, one or more cameras, a radio detection and ranging (RADAR) sensor, an infrared sensor, one or more ultrasonic sensors, a dedicated short-range communication (DSRC) module, an inertial navigation system (INS) including accelerometers and gyroscopes, and/or an odometry sensor. The cameras are configured to capture a plurality of images in the vehicle driving environment 100, and the plurality of images are applied to map the vehicle driving environment 100 to a 3D vehicle space and identify a location of the vehicle 102 within the environment 100. The cameras also operate with one or more other sensors (e.g., GPS, LiDAR, RADAR, INS) to localize the vehicle 102 in the 3D vehicle space. For example, the GPS identifies a geographical position (geo-location) of the vehicle 102 on the Earth, and the INS measures relative vehicle speeds and accelerations between the vehicle 102 and adjacent vehicles 102. The LiDAR scanner measures a distance of the vehicle 102 to adjacent vehicles 102 and other objects. Data collected by these sensors are used to determine vehicle locations determined from the plurality of images or facilitate determining vehicle locations between two images.

The vehicle control system includes a plurality of actuators for at least steering, braking, controlling the throttle (e.g., accelerating, maintaining a constant velocity, or decelerating), and transmission control. Depending on the level of automation, each of the plurality of actuators (or manually controlling the vehicle, e.g., by turning the steering wheel) can be controlled manually by a driver of the vehicle, automatically by the one or more processors of the vehicle, or jointly by both of the driver and processor(s). When the vehicle 102 controls the plurality of actuators independently or jointly with the driver, the vehicle 102 obtains the sensor data collected by the plurality of sensors, identifies adjacent road features in the vehicle driving environment 100, tracks the motion of the vehicle, tracks the relative distance between the vehicle and any surrounding vehicles or other objects, and generates vehicle control instructions to at least partially autonomously control driving of the vehicle 102. Conversely, in some embodiments, when the driver takes control of the vehicle, the driver manually provides vehicle control instructions via a steering wheel, a braking pedal, a throttle pedal, and a gear lever directly. In some embodiments, a vehicle user application is executed on the vehicle and configured to provide a user interface. The driver provides vehicle control instructions to control the plurality of actuators of the vehicle control system via the user interface of the vehicle user application. By these means, the vehicle 102 is configured to drive with its own vehicle control system and/or the driver of the vehicle 102 according to a certain level of autonomy.

In some embodiments, autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

More specifically, in some embodiments, the vehicle 102 drives in the vehicle driving environment 100 at level 5. The vehicle 102 collects sensor data from the plurality of sensors, processes the sensor data to generate vehicle control instructions, and controls the vehicle control system to drive the vehicle autonomously in response to the vehicle control instructions. Alternatively, in some situations, a vehicle 102 drives in the vehicle driving environment 100 at level 0. The vehicle 102 collects the sensor data and processes the sensor data to provide feedback (e.g., a warning or alert) to a driver of the vehicle 102 to allow the driver to drive the vehicle 102 manually and based on the driver's own judgement. Alternatively, in some situations, a vehicle 102 drives in the vehicle driving environment 100 partially autonomously at one of levels 1-4. The vehicle 102 collects the sensor data and processes the sensor data to generate a vehicle control instruction for a portion of the vehicle control system and/or provide feedback to a driver of the vehicle 102. The vehicle 102 is driven jointly by the vehicle control system of the vehicle 102 and the driver of the vehicle 102. Optionally, the vehicle control system and driver of the vehicle 102 control different portions of the vehicle 102. Optionally, the vehicle 102 determines a vehicle status. Based on the vehicle status, a vehicle control instruction of one of the vehicle control system or driver of the vehicle 102 preempts or overrides another vehicle control instruction provided by the other one of the vehicle control system or driver of the vehicle 102.

For vehicle 102, the sensor data collected by the plurality of sensors, the vehicle control instructions applied to the vehicle control system, and the user inputs received via the vehicle user application form a collection of vehicle data 112. In some embodiments, at least a subset of vehicle data 112 from each vehicle 102 is provided to one or more servers 104. A server 104 provides a central vehicle platform for collecting and analyzing the vehicle data 112, monitoring vehicle operation, detecting faults, providing driving solutions, and updating additional vehicle information 114 to individual vehicles 102 or client devices 108. In some embodiments, the server 104 manages vehicle data 112 of each individual vehicle 102 separately. In some embodiments, the server 104 consolidates vehicle data 112 from multiple vehicles 102 and manages the consolidated vehicle data jointly, e.g., statistically aggregates the data.

Additionally, in some embodiments, the vehicle driving environment 100 further includes one or more client devices 108, e.g., desktop computers, laptop computers, tablet computers, and mobile phones. Each client device 108 is configured to execute a client user application associated with the central vehicle platform provided by the server 104. The client device 108 is logged onto a user account on the client user application, and the user account is associated with one or more vehicles 102. The server 104 provides the collected vehicle data 112 and additional vehicle information 114 (e.g., vehicle operation information, fault information, or driving solution information) for the one or more associated vehicles 102 to the client device 108 using the user account of the client user application. In some embodiments, the client device 108 is located in the one or more vehicles 102, while in other embodiments, the client device is at a location distinct from the one or more associated vehicles 102. As such, the server 104 can apply its computational capability to manage the vehicle data and facilitate vehicle monitoring and control on different levels, e.g., for each individual vehicle, for a collection of vehicles, and for related client devices 108.

The plurality of vehicles 102, one or more servers 104, and one or more client devices 108 are communicatively coupled to each other via one or more communication networks 110, which are used to provide communications links between these vehicles and computers connected together within the vehicle driving environment 100. The one or more communication networks 110 may include connections, such as a wired network, wireless communication links, or fiber optic cables. Examples of the one or more communication networks 110 include local area networks (LAN), wide area networks (WAN) such as the Internet, or a combination thereof. The one or more communication networks 110 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth®, Wi-Fi, voice over Internet Protocol (VoIP), Wi-MAX, or any other suitable communication protocol. A connection to the one or more communication networks 110 may be established either directly (e.g., using 3G/4G connectivity to a wireless carrier), or through a network interface (e.g., a router, switch, gateway, hub, or an intelligent, dedicated whole-home control node), or through any combination thereof. In some embodiments, the one or more communication networks 110 allow for communication using any suitable protocols, like Transmission Control Protocol/Internet Protocol (TCP/IP). In some embodiments, each vehicle 102 is communicatively coupled to the server(s) 104 via a cellular communication network.

In some embodiments, deep learning techniques are applied by the vehicles 102, server(s) 104, or both to process the vehicle data 112. For example, in some embodiments, after image data are collected by the cameras of one of the vehicles 102, the image data is processed using an object detection model to identify objects (e.g., road features including, but not limited to, vehicles, lane lines, lane markers (e.g., lane markings), shoulder lines, road dividers, traffic lights, traffic signs, road signs, cones, a pedestrian, a bicycle, and a driver of the first vehicle) in the vehicle driving environment 100. In some embodiments, additional sensor data are also collected and processed by a vehicle control model to generate a vehicle control instruction for controlling the vehicle control system. In some embodiments, a vehicle planning model may also be applied to plan a driving control process based on the collected sensor data and the vehicle driving environment 100. The object detection model, vehicle control model, and vehicle planning model are collectively referred to herein as vehicle data processing models, each of which includes one or more neural networks. Such a vehicle data processing model is optionally applied by the vehicles 102, server(s) 104, or both to process the vehicle data 112 to infer associated vehicle status and/or provide control signals. In some embodiments, a vehicle data processing model is trained by a server 104, and applied locally or provided to one or more vehicles 102 for inference of the associated vehicle status and/or to provide control signals. Alternatively, a vehicle data processing model is trained locally by a vehicle 102, and applied locally or shared with one or more other vehicles 102, e.g., by way of the server 104. A vehicle data processing model is optionally trained in a supervised, semi-supervised, or unsupervised manner.

Figure 2:
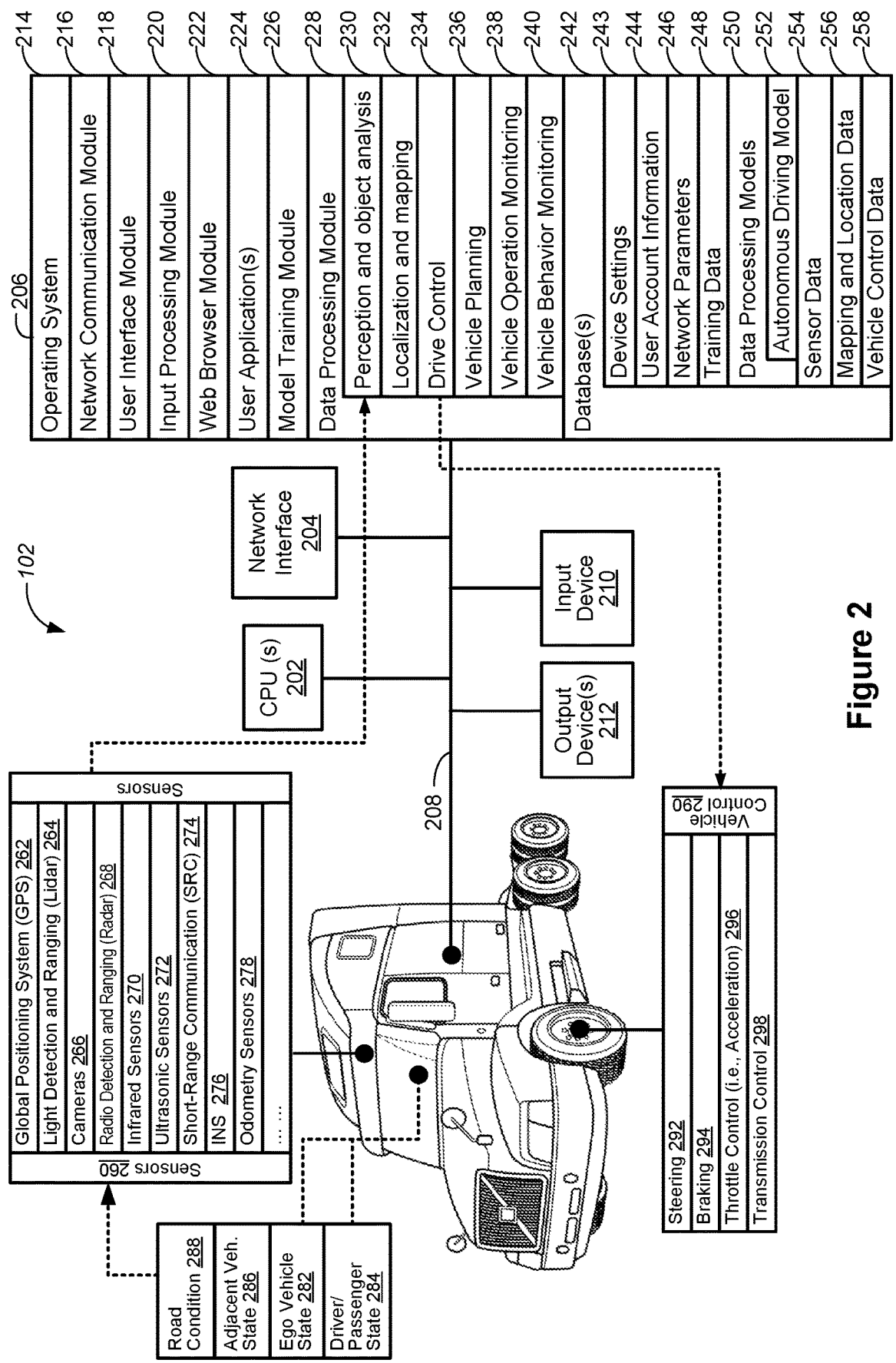
FIG. 2 is a block diagram of an example vehicle configured to be driven with a certain level of autonomy, in accordance with some embodiments.

FIG. 2 is a block diagram of an example vehicle 102 configured to be driven with a certain level of autonomy, in accordance with some embodiments. The vehicle 102 typically includes one or more processing units (CPUs) 202, one or more network interfaces 204, memory 206, and one or more communication buses 208 for interconnecting these components (sometimes called a chipset). The vehicle 102 includes one or more user interface devices. The user interface devices include one or more input devices 210, which facilitate user input, such as a keyboard, a mouse, a voice-command input unit or microphone, a touch screen display, a touch-sensitive input pad, a gesture capturing camera, or other input buttons or controls. Furthermore, in some embodiments, the vehicle 102 uses a microphone and voice recognition or a camera and gesture recognition to supplement or replace the keyboard. In some embodiments, the one or more input devices 210 include one or more cameras, scanners, or photo sensor units for capturing images, for example, of a driver and a passenger in the vehicle 102. The vehicle 102 also includes one or more output devices 212, which enable presentation of user interfaces and display content, including one or more speakers and/or one or more visual displays (e.g., a display panel located near to a driver's right hand in right-hand-side operated vehicles typical in the U.S.).

The vehicle 102 includes a plurality of sensors 260 configured to collect sensor data in a vehicle driving environment 100. The plurality of sensors 260 include one or more of a GPS 262, a LiDAR scanner 264, one or more cameras 266, a RADAR sensor 268, an infrared sensor 270, one or more ultrasonic sensors 272, a DSRC module 274, an INS 276 including accelerometers and gyroscopes, and an odometry sensor 278. The GPS 262 localizes the vehicle 102 in an Earth coordinate, e.g., using a latitude value and a longitude value, and can reach a first accuracy level up to less than 1 meter (e.g., 30 cm). The LiDAR scanner 264 uses light beams to estimate relative distances between the scanner 264 and a target object (e.g., another vehicle 102), and can reach a second accuracy level better than the first accuracy level of the GPS 262. The cameras 266 are installed at different locations of the vehicle 102 to monitor surroundings of the camera 266 from different perspectives. In some situations, a camera 266 is installed facing an interior of the vehicle 102 and configured to monitor a state of a driver of the vehicle 102. The RADAR sensor 268 emits electromagnetic waves and collects reflected waves to determine a speed and a distance of an object over which the waves are reflected. The infrared sensor 270 identifies and tracks objects in an infrared domain when lighting conditions are poor. The one or more ultrasonic sensors 272 are used to detect objects in a short distance, e.g., to assist parking. The DSRC module 274 is used to exchange information with a road feature (e.g., a traffic light). The INS 276 uses the accelerometers and gyroscopes to measure a position, orientation, and speed of the vehicle. The odometry sensor 278 tracks a distance the vehicle 102 has travelled, e.g., based on a wheel speed. In some embodiments, based on the sensor data collected by the plurality of sensors 260, the one or more processors 202 of the vehicle monitors its own vehicle state 282, a driver or passenger state 284, states of adjacent vehicles 286, and road conditions 288 associated with a plurality of road features.

Additionally, the vehicle 102 has a control system 290 including a steering control 292, a braking control 294, a throttle control 296, a transmission control 298, signaling and lighting controls, and other controls. In some embodiments, one or more actuators of the vehicle control system 290 are automatically controlled based on the plurality of sensor data collected by the plurality of sensors 260, e.g., according to one or more of the vehicle state 282, driver or passenger state 284, states of adjacent vehicles 286, and road conditions 288.

The memory 206 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 206 includes one or more storage devices remotely located from one or more processing units 202. The memory 206, or alternatively the non-volatile the memory within the memory 206, includes a non-transitory computer readable storage medium. In some embodiments, the memory 206, or the non-transitory computer readable storage medium of memory 206, stores the following programs, modules, and data structures, or a subset or superset thereof:

an operating system 214, which includes procedures for handling various basic system services and for performing hardware dependent tasks;

a network communication module 216, which connects each vehicle 102 to other devices (e.g., another vehicle 102, server 104, client device 108) via one or more network interfaces (wired or wireless) and one or more communication networks 110, such as the Internet, other wide area networks, local area networks, metropolitan area networks, and so on;

a user interface module 218, which enables presentation of information (e.g., a graphical user interface for application 224, widgets, websites and web pages thereof, audio content, and/or video content) at the vehicle 102 via one or more output devices 212 (e.g., displays or speakers);

an input processing module 220, which detects one or more user inputs or interactions from one of the one or more input devices 210 and interprets the detected input or interaction;

a web browser module 222, which navigates, requests (e.g., via HTTP), and displays websites and web pages thereof, including a web interface for logging into a user account of a user application 224 associated with the vehicle 102 or another vehicle;

one or more user applications 224, which is executed at the vehicle 102 and includes a vehicle user application that controls the vehicle 102 and edits and reviews settings and data associated with the vehicle 102;

a model training module 226, which trains a vehicle data processing model 250 that includes at least one neural network and is applied to process vehicle data (e.g., sensor data and vehicle control data) of the vehicle 102;

a data processing module 228, which performs a plurality of on-vehicle tasks including, but not limited to, perception and object analysis 230, vehicle localization and environment mapping 232, vehicle drive control 234, vehicle drive planning 236, local operation monitoring 238, and vehicle driving behavior monitoring 240;

Vehicle device database 242 that stores vehicle data 112, including:

device settings 243, including common device settings (e.g., service tier, device model, storage capacity, processing capabilities, communication capabilities, and/or medical procedure settings) of the vehicle 102;

user account information 244 for the one or more user applications 224 (e.g., user names, security questions, account history data, user preferences, and predefined account settings);

network parameters 246 for the one or more communication networks 110, e.g., IP address, subnet mask, default gateway, DNS server and host name;

training data 248 for training a vehicle data processing model 250;

vehicle data processing models 250 for processing vehicle data 112, where in some embodiments, the vehicle data processing models 250 include an autonomous driving model 252 configured to drive the vehicle 102 at least partially autonomously;

sensor data 254 captured or measured by the plurality of sensors 260;

mapping and location data 256 that are determined from the sensor data 254 to map the vehicle driving environment 100 and locations of the vehicle 102 in the environment 100; and vehicle control data 258 that are automatically generated by the vehicle 102 or manually inputted by the user via the vehicle control system 290 to drive the vehicle 102.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 206 stores a subset of the modules and data structures identified above. In some embodiments, the memory 206 stores additional modules and data structures not described above. In some embodiments, a subset of the programs, modules, and/or data stored in the memory 206 are stored on and/or executed by the server system 104.

Figure 3:
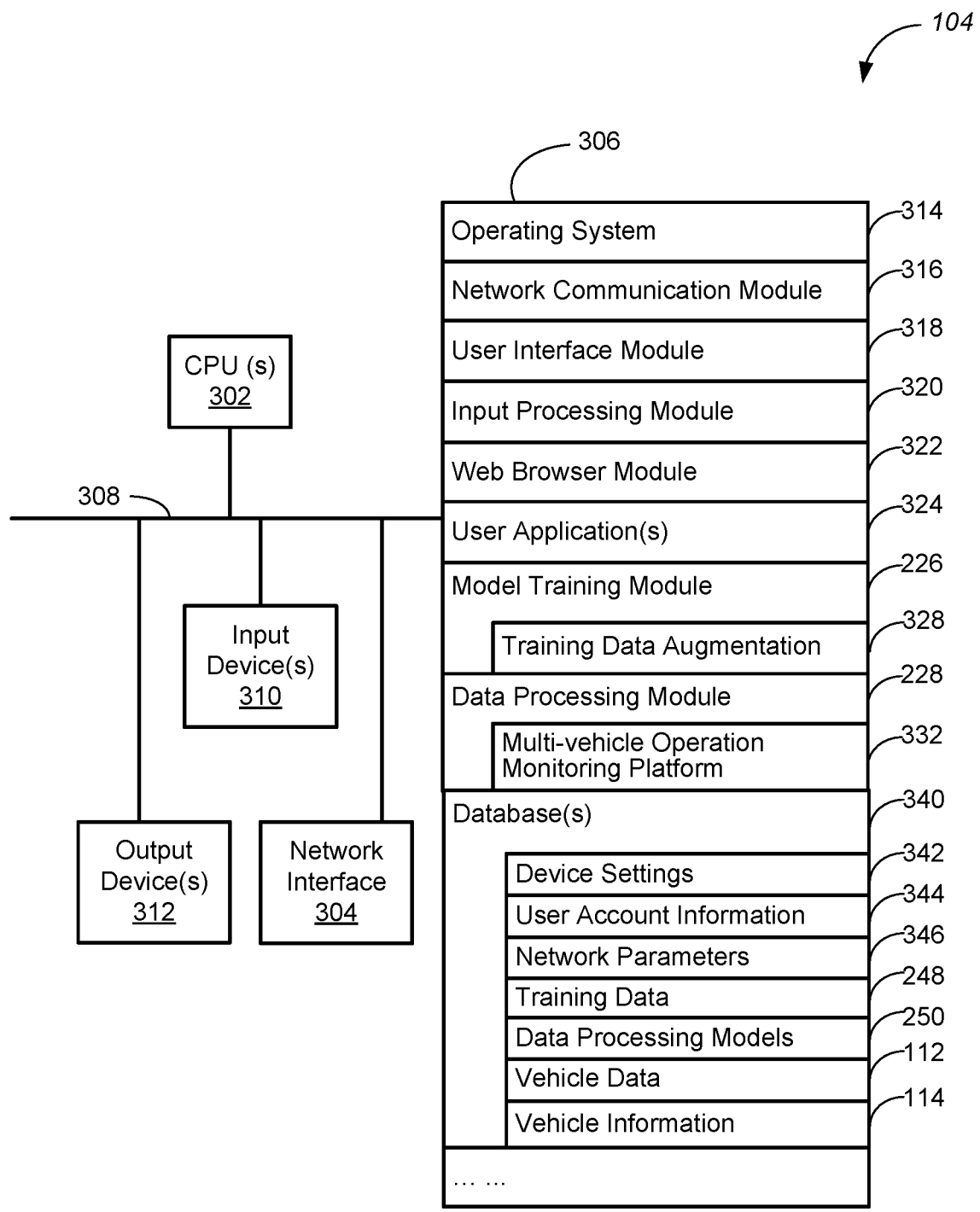
FIG. 3 is a block diagram of an example server for monitoring and managing vehicles in a vehicle driving environment, in accordance with some embodiments.

FIG. 3 is a block diagram of an example server 104 for monitoring and managing vehicles 102 in a vehicle driving environment (e.g., the environment 100 in FIG. 1), in accordance with some embodiments. Examples of the server 104 include, but are not limited to, a server computer, a desktop computer, a laptop computer, a tablet computer, or a mobile phone. The server 104 typically includes one or more processing units (CPUs) 302, one or more network interfaces 304, memory 306, and one or more communication buses 308 for interconnecting these components (sometimes called a chipset). The server 104 includes one or more user interface devices. The user interface devices include one or more input devices 310, which facilitate user input, such as a keyboard, a mouse, a voice-command input unit or microphone, a touch screen display, a touch-sensitive input pad, a gesture capturing camera, or other input buttons or controls. Furthermore, in some embodiments, the server 104 uses a microphone and voice recognition or a camera and gesture recognition to supplement or replace the keyboard. In some embodiments, the one or more input devices 310 include one or more cameras, scanners, or photo sensor units for capturing images, for example, of graphic serial codes printed on electronic devices. The server 104 also includes one or more output devices 312, which enable presentation of user interfaces and display content, including one or more speakers and/or one or more visual displays.

The memory 306 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 306 includes one or more storage devices remotely located from one or more processing units 302. The memory 306, or alternatively the non-volatile memory within memory 306, includes a non-transitory computer readable storage medium. In some embodiments, the memory 306, or the non-transitory computer readable storage medium of the memory 306, stores the following programs, modules, and data structures, or a subset or superset thereof:

an operating system 314, which includes procedures for handling various basic system services and for performing hardware dependent tasks;

a network communication module 316, which connects the server 104 to other devices (e.g., vehicles 102, another server 104, client devices 108) via one or more network interfaces (wired or wireless) and one or more communication networks 110, such as the Internet, other wide area networks, local area networks, metropolitan area networks, and so on;

a user interface module 318, which enables presentation of information (e.g., a graphical user interface for user application 324, widgets, websites and web pages thereof, audio content, and/or video content) at the vehicle 102 via one or more output devices 312 (e.g., displays or speakers);

an input processing module 320, which detects one or more user inputs or interactions from one of the one or more input devices 310 and interprets the detected input or interaction;

a web browser module 322, which navigates, requests (e.g., via HTTP), and displays websites and web pages thereof, including a web interface for logging into a user account of a user application 324;

one or more user applications 324, which is executed at the server 104 and includes a vehicle user application that associates vehicles 102 with user accounts and facilitates controlling the vehicles 102 and editing and reviewing settings and data associated with the vehicles 102;

a model training module 226, which trains a vehicle data processing model 250 that includes at least one neural network and is applied to process vehicle data (e.g., sensor data and vehicle control data) of one or more vehicles 102;

a data processing module 228, which manages a multi-vehicle operation monitoring platform 332 configured to collect vehicle data 112 from a plurality of vehicles 102, monitor vehicle operation, detect faults, provide driving solutions, and update additional vehicle information 114 to individual vehicles 102 or client devices 108, where the data processing module 228 optionally manages vehicle data 112 for each individual vehicle 102 separately or processes vehicle data 112 of multiple vehicles 102 jointly, e.g., statistically;

vehicle server data 340, including:
- device settings 342, which include common device settings (e.g., service tier, device model, storage capacity, processing capabilities, communication capabilities, and/or medical procedure settings) of the server 104;
- user account information 344 for the one or more user applications 324 (e.g., user names, security questions, account history data, user preferences, and predefined account settings);
- network parameters 346 for the one or more communication networks 110, e.g., IP address, subnet mask, default gateway, DNS server and host name;
- training data 248 for training a vehicle data processing model 250;
- vehicle data processing models 250 for processing vehicle data, where the vehicle data processing models 250 include an autonomous driving model 252 configured to drive the vehicle 102 at least partially autonomously;
- vehicle data 112, which is collected from a plurality of vehicles 102 and includes sensor data 254, mapping and location data 256, and vehicle control data 258; and
- additional vehicle information 114 including vehicle operation information, fault information, or driving solution information, which are generated from the collected vehicle data 112.

In some embodiments, the model training module 226 includes a training data augmentation module 328 configured to synthesize training data based on a predefined dataset or collected sensor data (or camera data) of the vehicles 102. Optionally, the predefined dataset is used with the synthesized training data to train a vehicle data processing model 250. Optionally, the collected sensor data is optionally used with the synthesized training data to train a vehicle data processing model 250. Optionally, the synthesized training data is used independently to train a vehicle data processing model 250. By these means, the training data can be augmented conveniently, allowing the vehicle data processing model 250 to be trained efficiently and offer a higher accuracy level.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 306 stores a subset of the modules and data structures identified above. In some embodiments, the memory 306 stores additional modules and data structures not described above. In some embodiments, a subset of the programs, modules, and/or data stored in the memory 306 are stored on and/or executed by the vehicle 102.

Figure 4:
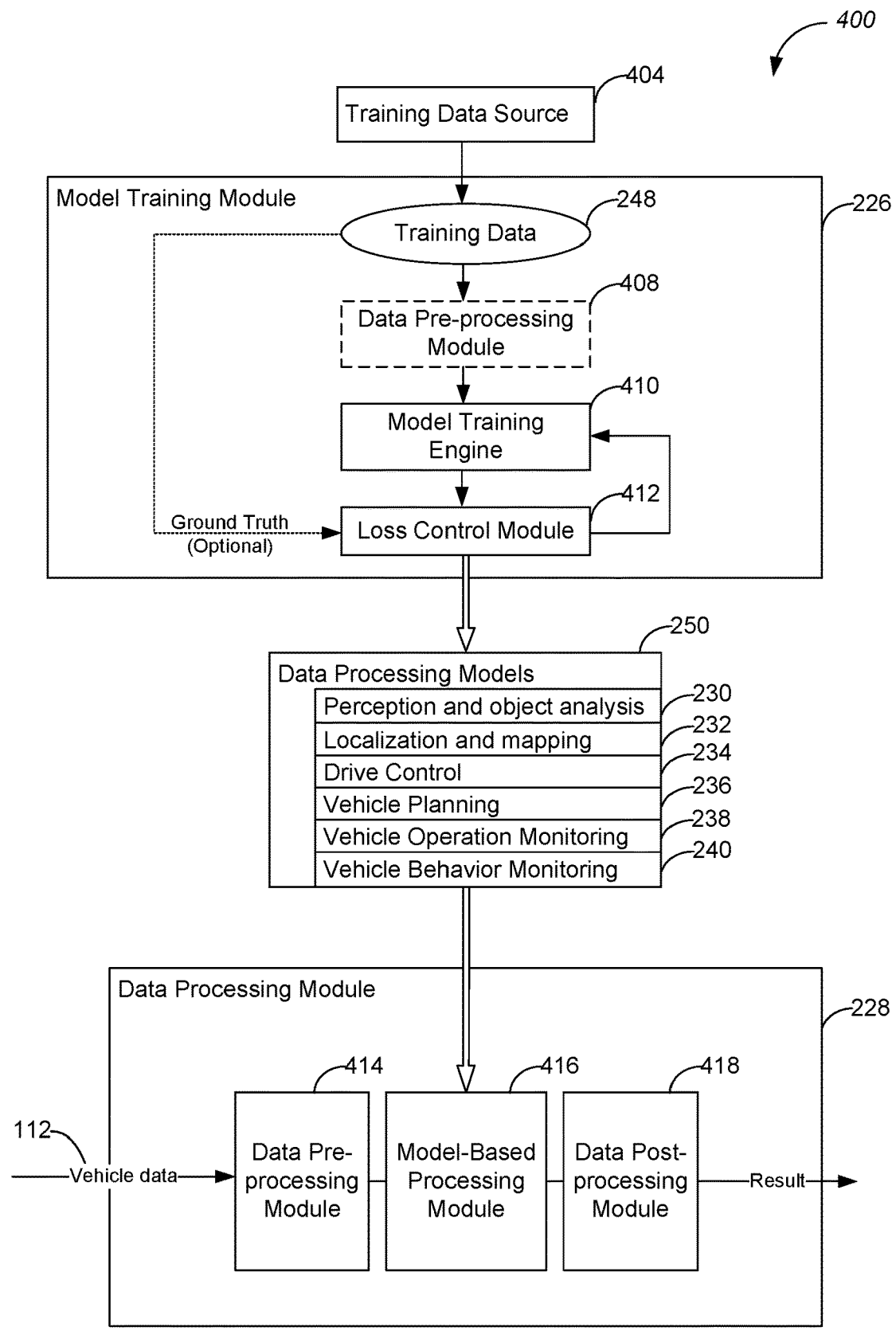
FIG. 4 is a block diagram of a machine learning system for training and applying vehicle data processing models for facilitating at least partial autonomous driving of a vehicle, in accordance with some embodiments.
Figure 5A:
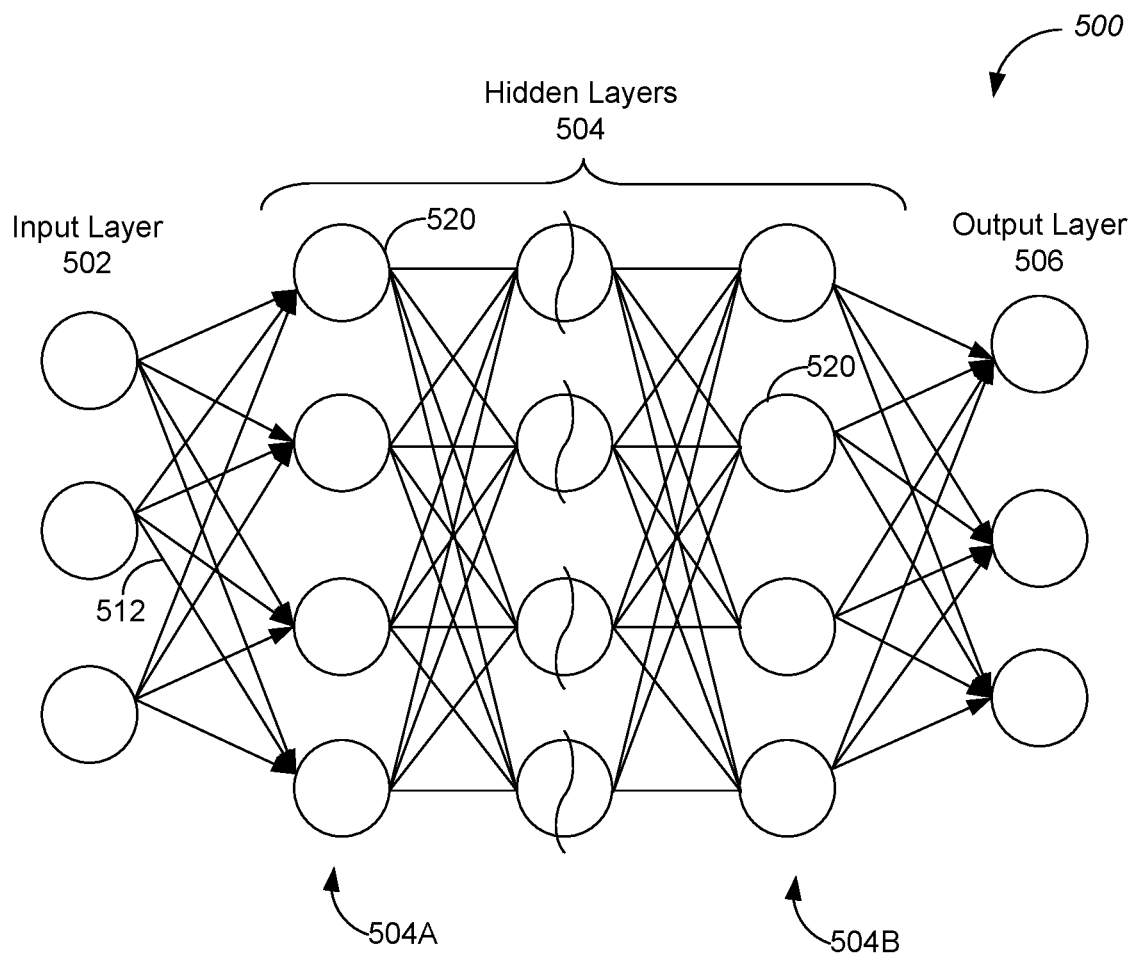
FIG. 5A is a structural diagram of an example neural network applied to process vehicle data in a vehicle data processing model, in accordance with some embodiments.
Figure 5B:
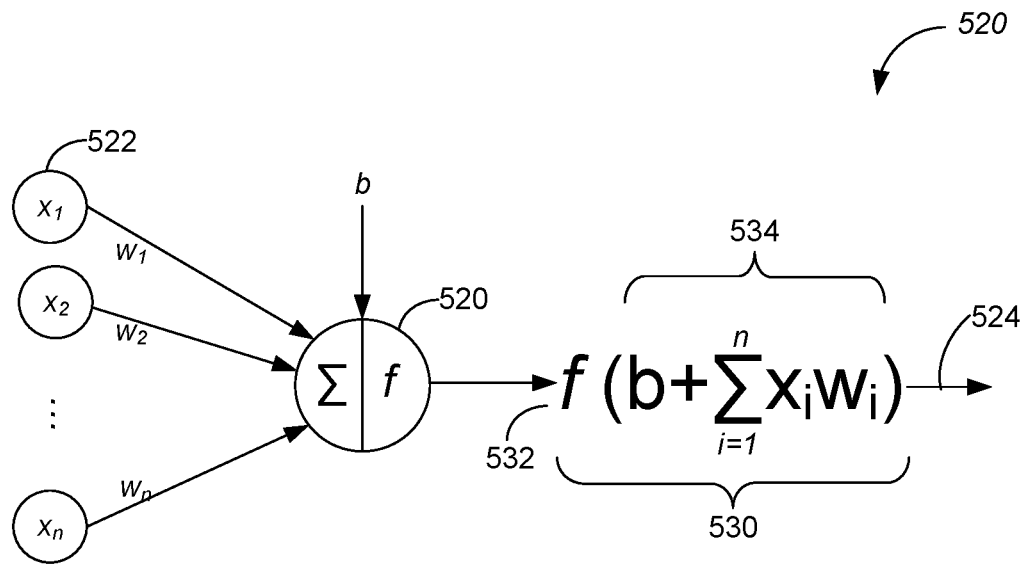
FIG. 5B is an example node in the neural network, in accordance with some embodiments.
Figure 6A:
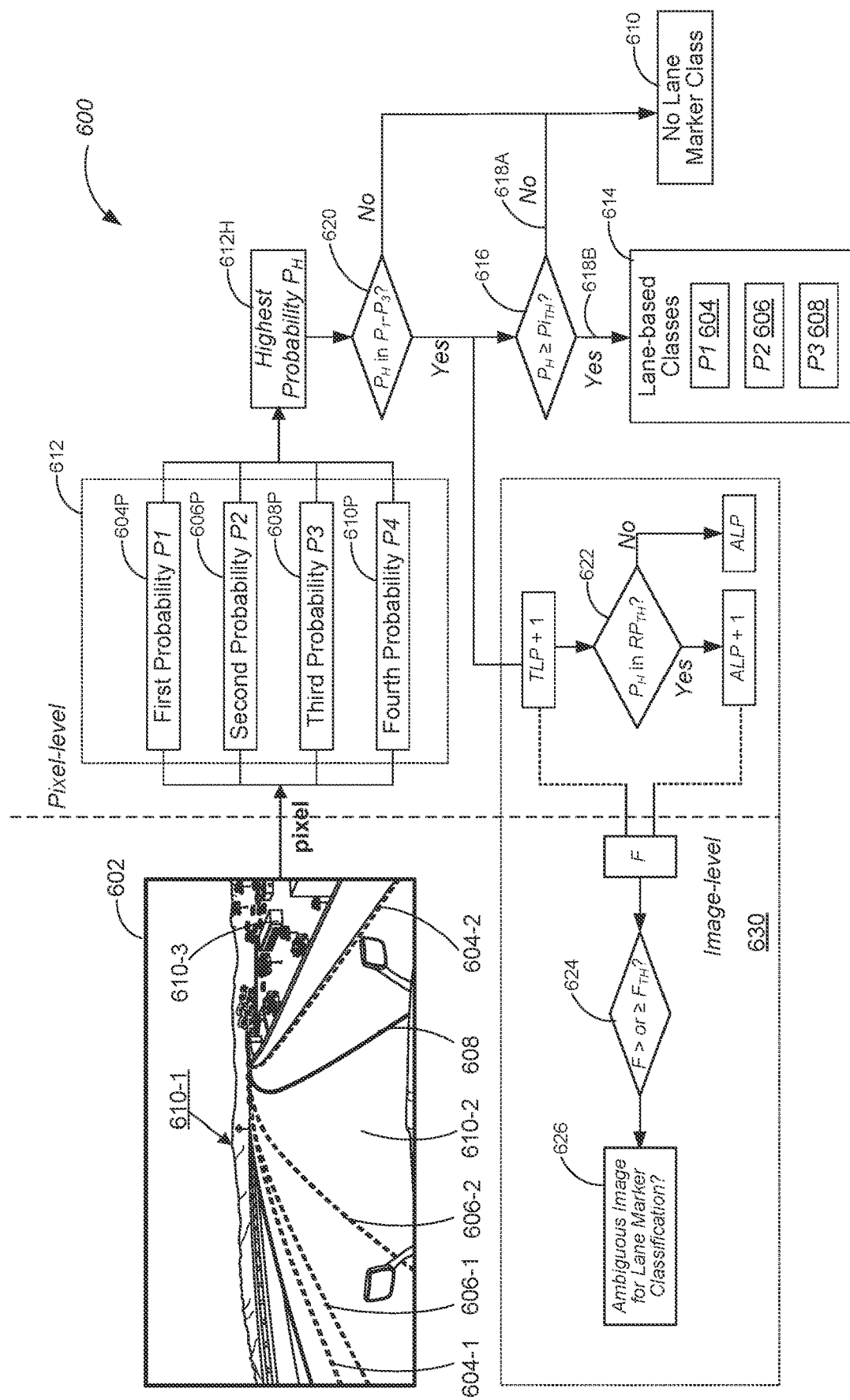
FIG. 6A is a flow diagram of an exemplary process of classifying an image on both a pixel level and an image level, in accordance with some embodiments.

FIGS. 4, 5A, and 5B provide background on the machine learning systems described herein, which are helpful in understanding the details of the embodiments described from FIG. 6A onward.

FIG. 4 is a block diagram of a machine learning system 400 for training and applying vehicle data processing models 250 for facilitating driving of a vehicle, in accordance with some embodiments. The machine learning system 400 includes a model training module 226 establishing one or more vehicle data processing models 250 and a data processing module 228 for processing vehicle data 112 using the vehicle data processing model 250. In some embodiments, both of the model training module 226 (e.g., the model training module 226 in FIG. 2) and the data processing module 228 are located within the vehicle 102, while a training data source 404 provides training data 248 to the vehicle 102. The training data source 404 is optionally the data obtained from the vehicle 102 itself, a server 104, storage 106, or another vehicle or vehicles 102. Alternatively, in some embodiments, the model training module 226 (e.g., the model training module 226 in FIG. 3) is located at a server 104, and the data processing model(s) 228 are located in a vehicle 102. The server 104 trains the data processing models 250 and provides the trained models 250 to the vehicle 102 to process real-time vehicle data 112 detected by the vehicle 102. In some embodiments, the training data 248 provided by the training data source 404 include a standard dataset (e.g., a set of road images) widely used by engineers in the autonomous vehicle industry to train vehicle data processing models 250. In some embodiments, the training data 248 include vehicle data 112 and/or additional vehicle information 114, which are collected from one or more vehicles 102 that will apply the vehicle data processing models 250 or from distinct vehicles 102 that will not apply the vehicle data processing models 250. The vehicle data 112 further includes one or more of sensor data 254, road mapping and location data 256, and control data 258. Further, in some embodiments, a subset of training data 248 is modified to augment the training data 248. The subset of modified training data is used in place of or jointly with the subset of training data 248 to train the vehicle data processing models 250.

In some embodiments, the model training module 226 (FIG. 2) includes a model training engine 410, and a loss control module 412. Each vehicle data processing model 250 is trained by the model training engine 410 to process corresponding vehicle data 112 to implement a respective one of a plurality of on-vehicle tasks including, but not limited to, perception and object analysis 230, vehicle localization and environment mapping 232, vehicle drive control 234, vehicle drive planning 236, local operation monitoring 238, and vehicle driving behavior monitoring 240. Specifically, the model training engine 410 receives the training data 248 corresponding to a vehicle data processing model 250 to be trained, processes the training data using the vehicle data processing model 250, and generates an output from each training data item. In some embodiments, during this process, the loss control module 412 monitors a loss function comparing the output associated with the respective training data item to a ground truth of the respective training data item. In this embodiment, the model training engine 410 modifies the vehicle data processing model(s) 250 to reduce any loss function, until the loss function satisfies a loss criteria (e.g., a comparison result of the loss function is minimized or reduced below a loss threshold). The vehicle data processing model(s) 250 are thereby trained and provided to the data processing module 228 of a vehicle 102 to process real-time vehicle data 112 from the vehicle.

In some embodiments, the model training module 226 further includes a data pre-processing module 408 configured to pre-process the training data 248 before the training data 248 is used by the model training engine 410 to train a vehicle data processing model 250. For example, an image pre-processing module 408 is configured to process road images in the training data 248 to a predefined image format, e.g., normalize the road images to a fixed size, resolution or contrast level. In another example, an image pre-processing module 408 extracts a region of interest (ROI) corresponding to a drivable area in each road image or separate content of the drivable area into a distinct image.

In some embodiments, the model training module 226 offers supervised learning in which the training data 248 is labelled and includes a desired output for each training data item (also called the ground truth in some situations). The desirable output is optionally labelled manually by human or automatically by the model training model 226 before training. Conversely, in some embodiments, the model training module 226 offers unsupervised learning in which the training data 248 are not labelled. The model training module 226 is configured to identify previously undetected patterns in the training data 248 without pre-existing labels and with no or little human supervision. Additionally, in some embodiments, the model training module 226 offers partially supervised learning in which the training data are partially labelled.

In some embodiments, the data processing module 228 includes a data pre-processing module 414, a model-based processing module 416, and a data post-processing module 418. The data pre-processing modules 414 pre-processes vehicle data 112 based on the type of the vehicle data 112. In some embodiments, functions of the data pre-processing modules 414 are consistent with those of the pre-processing modules 408, and convert the vehicle data 112 to a pre-defined data format that is suitable for the inputs of the model-based processing module 416. The model-based processing module 416 applies the trained vehicle data processing model 250 provided by the model training module 226 to process the pre-processed vehicle data 112. In some embodiments, the model-based processing module 416 can also monitor an error indicator to determine whether the vehicle data 112 has been properly processed in the vehicle data processing model 250. In some embodiments, the processed vehicle data is further processed by the data post-processing module 418 in a preferred format or to provide additional vehicle information 114 that can be derived from the processed vehicle data. The data processing module 228 used the processed vehicle data to at least partially autonomously drive the vehicle 102, e.g., at least partially autonomously. For example, the processed vehicle data includes vehicle control instructions that are used by the vehicle control system 290 to drive the vehicle 102.

FIG. 5A is a structural diagram of an example neural network 500 applied to process vehicle data in a vehicle data processing model 250, in accordance with some embodiments, and FIG. 5B is an example node 520 in the neural network 500, in accordance with some embodiments. It should be noted that this description is used as an example only, and other types or configurations may be used to implement the embodiments described herein. The vehicle data processing model 250 is established based on the neural network 500. A corresponding model-based processing module 416 applies the vehicle data processing model 250 including the neural network 500 to process vehicle data 112 that has been converted to a predefined data format. The neural network 500 includes a collection of nodes 520 that are connected by links 512. Each node 520 receives one or more node inputs 522 and applies a propagation function 530 to generate a node output 524 from the one or more node inputs. As the node output 524 is provided via one or more links 512 to one or more other nodes 520, a weight w associated with each link 512 is applied to the node output 524. Likewise, the one or more node inputs 522 are combined based on corresponding weights $w_1$, $w_2$, $w_3$, and $w_4$ according to the propagation function 530. In an example, the propagation function 530 is a product of a non-linear activation function 532 and a linear weighted combination of the one or more node inputs 522.

The collection of nodes 520 is organized into one or more layers in the neural network 500. Optionally, the one or more layers includes a single layer acting as both an input layer and an output layer. Optionally, the one or more layers includes an input layer 502 for receiving inputs, an output layer 506 for providing outputs, and zero or more hidden layers 504 (e.g., 504A and 504B) between the input layer 502 and the output layer 506. A deep neural network has more than one hidden layer 504 between the input layer 502 and the output layer 506. In the neural network 500, each layer is only connected with its immediately preceding and/or immediately following layer. In some embodiments, a layer 502 or 504B is a fully connected layer because each node 520 in the layer 502 or 504B is connected to every node 520 in its immediately following layer 504A or 506, respectively. In some embodiments, one of the one or more hidden layers 504 includes two or more nodes that are connected to the same node in its immediately following layer for down sampling or pooling the two or more nodes 520. Particularly, max pooling uses a maximum value of the two or more nodes in the layer 504B for generating the node of the immediately following layer 506 (i.e., the output layer 506) connected to the two or more nodes.

In some embodiments, a convolutional neural network (CNN) is applied in a vehicle data processing model 250 to process vehicle data (particularly, video and image data captured by cameras 266 of a vehicle 102). The CNN employs convolution operations and belongs to a class of deep neural networks. The one or more hidden layers 504 of the CNN are convolutional layers convolving with a multiplication or dot product. Each node in a convolutional layer receives inputs from a receptive area associated with a previous layer (e.g., five nodes), and the receptive area is smaller than the entire previous layer and may vary based on a location of the convolution layer in the CNN. For the input layer 502, a kernel is used to combine pixels in a respective area including each pixel to generate layer outputs (i.e., feature elements of a feature map). In an example, the kernel corresponds to a 3×3 matrix including weights applied to combine the pixels in the respective area of each pixel in a linear weighted manner. Video or image data is pre-processed to a predefined video/image format corresponding to the inputs of the CNN. The pre-processed video or image data is abstracted by each layer of the CNN to a respective feature map. By these means, video and image data can be processed by the CNN for video and image recognition or object detection.

In some embodiments, the CNN includes a semantic segmentation CNN configured to image pixels into one or more classes (e.g., lane marker classes). Each of the one or more classes corresponds to semantic content. In some embodiments, the data processing model 250 includes an efficient residual factorized ConvNet (ERFNet) for real-time semantic segmentation.

In some embodiments, a recurrent neural network (RNN) is applied in the vehicle data processing model 250 to process vehicle data 112. Nodes in successive layers of the RNN follow a temporal sequence, such that the RNN exhibits a temporal dynamic behavior. In an example, each node 520 of the RNN has a time-varying real-valued activation. It is noted that in some embodiments, two or more types of vehicle data are processed by the data processing module 228, and two or more types of neural networks (e.g., both CNN and RNN) are applied in the same vehicle data processing model 250 to process the vehicle data jointly.

The training process is a process for calibrating all of the weights $w_i$ for each layer of the neural network 500 using training data 248 which is provided in the input layer 502. The training process typically includes two steps, forward propagation and backward propagation, which are repeated multiple times until a predefined convergence condition is satisfied. In the forward propagation, the set of weights for different layers are applied to the input data and intermediate results from the previous layers. In the backward propagation, a margin of error of the output (e.g., a loss function) is measured, e.g., in a loss control module 412 in FIG. 4, and the weights are adjusted accordingly to decrease the error. The activation equation 534 is optionally linear, rectified linear unit, sigmoid, hyperbolic tangent, or of other types. In some embodiments, a network bias term b is added to the sum of the weighted outputs from the previous layer before the activation function 532 is applied. The network bias b provides a perturbation that helps neural network 500 avoid over fitting the training data. In some embodiments, the result of the training includes the network bias parameter b for each layer.

FIG. 6A is a flow diagram of an exemplary process of classifying an image 602 on both a pixel level and an image level, in accordance with some embodiments. Operations described in process 600 are performed by a computer system (e.g., a computer system located on vehicles 102, one or more servers 104, one or more client devices 108, or a combination thereof). The computer system includes one or more processors (e.g., CPU(s) 202 or CPU(s) 302) and memory (e.g., memory 206 or memory 306). The computer system optionally includes an event miner configured to detect whether a road image is an ambiguous image for lane marker classification. Lane markers (or lane markings) convey information to drivers by indicating which part of the road to use, what conditions lie ahead (e.g., merger of two lanes into one), and/or whether passing is allowed. Lane detection (or lane marker detection) refers to the task of detecting lane markers on the road. In some embodiments, lane marker detection and/or identification includes a multiclass segmentation task, wherein given an image (e.g., a road image), the computer system determines (e.g., predicts) that each pixel of the image belongs to a respective lane marker class (also called lane marker type).

In some embodiments, the computer system obtains the road image 602, which includes including a plurality of pixels. In some embodiments, the road image 602 is an image captured by one or more cameras (e.g., cameras 266 in FIG. 2) integrated in or attached to a vehicle 102. In some embodiments, a road image 602 includes one or more lane markers each of which has a respective lane marker class. For example, referring to FIG. 6A, the road image 602 includes curbs 604 (e.g., a left curb 604-1 and a right curb 604-2 on the road image 602). As used herein, a curb refers to a segment of the road where a road surface ends in a lateral direction that is generally perpendicular to a driving direction of the vehicle 102. In some embodiments, a curb is treated as a lane marker class. The road image 602 further includes one or more dashed lane markers 606 (e.g., dashed lane marker 606-1 and dashed lane marker 606-2), and one or more solid lane markers 608 (e.g., a center marker that separates lanes of two opposite directions, an edge marker that separates a drive lane and a shoulder area). The road image 602 further includes objects that belong to a no lane marker class 610, such as the mountain 610-1, road surface(s) 610-2, and buildings 610-3. In some embodiments, everything in the road image 602 except the curbs 604, the dashed lane markers 606, and the solid lane markers 608 is treated as having the no lane marker class 610, and the road image 602 includes four lane maker classes including the curb mark 604, dashed lane marker 606, solid lane marker 608, and no lane marker 610 classes.

In some embodiments, the computer device applies a classification neural network to classify each pixel of the plurality of pixels (or a group of pixels) of the road image to a respective road marker class (e.g., including, for each pixel, determining a plurality of probabilities associated with a plurality of lane marker classes). The classification neural network optionally includes a CNN (e.g., a fully convolutional network (FCN)). Optionally, the CNN has a kernel size of 3×3. In an example, the CNN of the classification neural network has an effective receptive field (ERF). In some embodiments, the classification neural network includes one of a U-Net (i.e., a symmetric encoder-decoder network), a pyramid scene parsing network, and a multi-path refinement network.

In some embodiments, for each pixel of the plurality of pixels of an image, the computer system determines a plurality of probabilities 612 of classifying the respective pixel to a plurality of corresponding road marker classes 604-610. For example, four probabilities 604P (P1), 606P (P2), 608P (P3), and 610P (P4) are determined for each pixel of the road image 602 to classify the respective pixel to a curb marker class 604, a dashed lane marker class 606, a solid lane marker class 608, and a no lane marker class 610, respectively. In some embodiments, the sum of the plurality of probabilities 612 for each pixel is equal to one or 100%. The curb marker class 604, dashed lane marker class 606, and solid lane marker class 608 form a subset of lane-based classes 614 in the plurality of marker classes 604-610.

In some embodiments, the computer system applies hard thresholding 616 to classifying each pixel of the road image 602 based on the plurality of probabilities 612 of the respective pixel. In accordance with a determination that each of a subset of probabilities of a first pixel of the road image 602 is lower than respective hard threshold values $P_{iTH}$ corresponding to the subset of lane-based classes 614, the computer system does not associate (618A) the first pixel with any of the subset of lane-based classes, and classifies the first pixel to the no lane marker class 610. Examples of respective hard threshold values $P_{iTH}$ for the curb mark 604, dashed lane marker 606, solid lane marker 608, and no lane marker 610 are 0.7, 0.75, 0.6, or 0.8, respectively. The respective hard threshold values $P_{iTH}$ are optionally equal or different for the curb mark 604, dashed lane marker 606, solid lane marker 608, and no lane marker 610.

In an example, the plurality of probabilities 612 of classifying the first pixel to the curb mark 604, dashed lane marker 606, solid lane marker 608, and no lane marker 610 are determined to be 0.05, 0.05, 0.6, and 0.3, respectively. And, in this example, the respective hard threshold values $P_{iTH}$ are equal to 0.7. The highest probability $P_H$ (0.6) corresponds to the solid lane marker 608 and is less than the threshold value of 0.7. The probabilities 604P and 606P corresponding to the curb mark 604 and dashed lane marker 606 are also less than threshold value of 0.7. The computer system therefore classifies the first pixel to the "no lane marker" class 610.

Conversely, in some embodiments, in accordance with a determination that one of a subset of probabilities 604P-608P of a second pixel of the road image 602 is higher than a corresponding hard threshold value $P_{iTH}$ of the subset of lane-based classes 604-608, the computer system classifies (618B) the second pixel to a respective one of the subset of the lane-based classes 604-608. For example, the plurality of probabilities 612 of classifying the second pixel to the curb mark 604, dashed lane marker 606, solid lane marker 608, and no lane marker 610 are determined to be 0.1, 0.75, 0.05, and 0.1, respectively. The respective hard threshold values $P_{iTH}$ are equal to 0.7. In accordance with a determination that the highest probability $P_H$ (e.g., 0.75) corresponds to the dashed lane marker 606 and exceeds the respective hard threshold value $P_{iTH}$, the computer system classifies the second pixel to the "dashed lane marker" class 606.

In some embodiments, each hard threshold value $P_{iTH}$ is predefined by the computer system (e.g., which optionally receives an input for the hard threshold value $P_{iTH}$ manually entered by an operator of the computer system). In some embodiments, each hard threshold value $P_{iTH}$ is determined in such a way as to obtain the best possible metric on a benchmark dataset. For each lane marker class, a higher threshold value $P_{iTH}$ leads to fewer false positives (e.g., a determination that there is a lane marker when no lane marker is present) whereas a lower threshold value $P_{iTH}$ produces more false positives. In some embodiments, after the autonomous driving model 252 has been trained, the model is benchmarked against a test set, and each hard threshold value $P_{iTH}$ can be adjusted (e.g., varied) according to a first number of false positives and a second number of false negatives produced by the autonomous driving model 252.

Referring to FIG. 6A, in some embodiments, the computer system is configured to determine (630) whether a road image 602 is an ambiguous image for lane marker classification. Specifically, the computer system initializes an ambiguous lane pixel count ALP and a total lane pixel count TLP to zero for the road image 602. For each pixel in the road image 602, the computer system identifies a class having a highest probability 612H ($P_H$) (e.g., using an arg max operation) and determines (620) whether the highest probability 612H ($P_H$) is among the probabilities P1, P2, and P3 corresponding to the subset of lane-based classes 614, i.e., whether the identified class belongs to a predefined subset of lane-based classes 614 (e.g., including the dashed lane marker class 606, the solid lane marker class 608, and the curb marker class 610). If the identified class belongs the predefined subset of lane-based classes 614, the computer system increments the total lane pixel count TLP by 1. Additionally, if the identified class belongs to one of the predefined subset of lane-based classes 614, the computer system determines (622) whether the highest probability 612H ($P_H$) of the respective pixel lies in a range RPTH around the respective hard threshold value $P_{iTH}$ (e.g., $P_{iTH-\Delta} < P_H < P_{iTH}+\Delta$), where $\Delta$ is a predetermined value defining the range, and examples of $\Delta$ include, but are not limited, to 0.02, 0.05, 0.1). The range RPTH is optionally symmetric or asymmetric with respect to the respective hard threshold value $P_{iTH}$, and the value $\Delta$ is optionally equal or different for each of the subset of lane-based classes 614. In accordance with a determination that the highest probability $P_H$ of the respective pixel lies in the range RPTH around the respective hard threshold value $P_{iTH}$, the computer system increments the ambiguous lane pixel count ALP (e.g., by one). By these means, the computer system determines the total lane pixel count TLP and ambiguous lane pixel count ALP based on the probabilities 612 of the plurality of road marker classes of each pixel.

The computer system further determines a fraction (e.g., ratio) F between the ambiguous lane pixel count ALP and the total lane pixel count TLP and compares (624) the fraction F with a threshold fraction $F_{TH}$ (also called threshold ratio). Examples of the threshold fraction $F_{TH}$ include, but are not limited to, 0.2, 0.25, and 0.3. Based on a comparison result, the computer system determines (626) whether the road image 602 is an ambiguous image for lane marker classification.

Figure 6B:
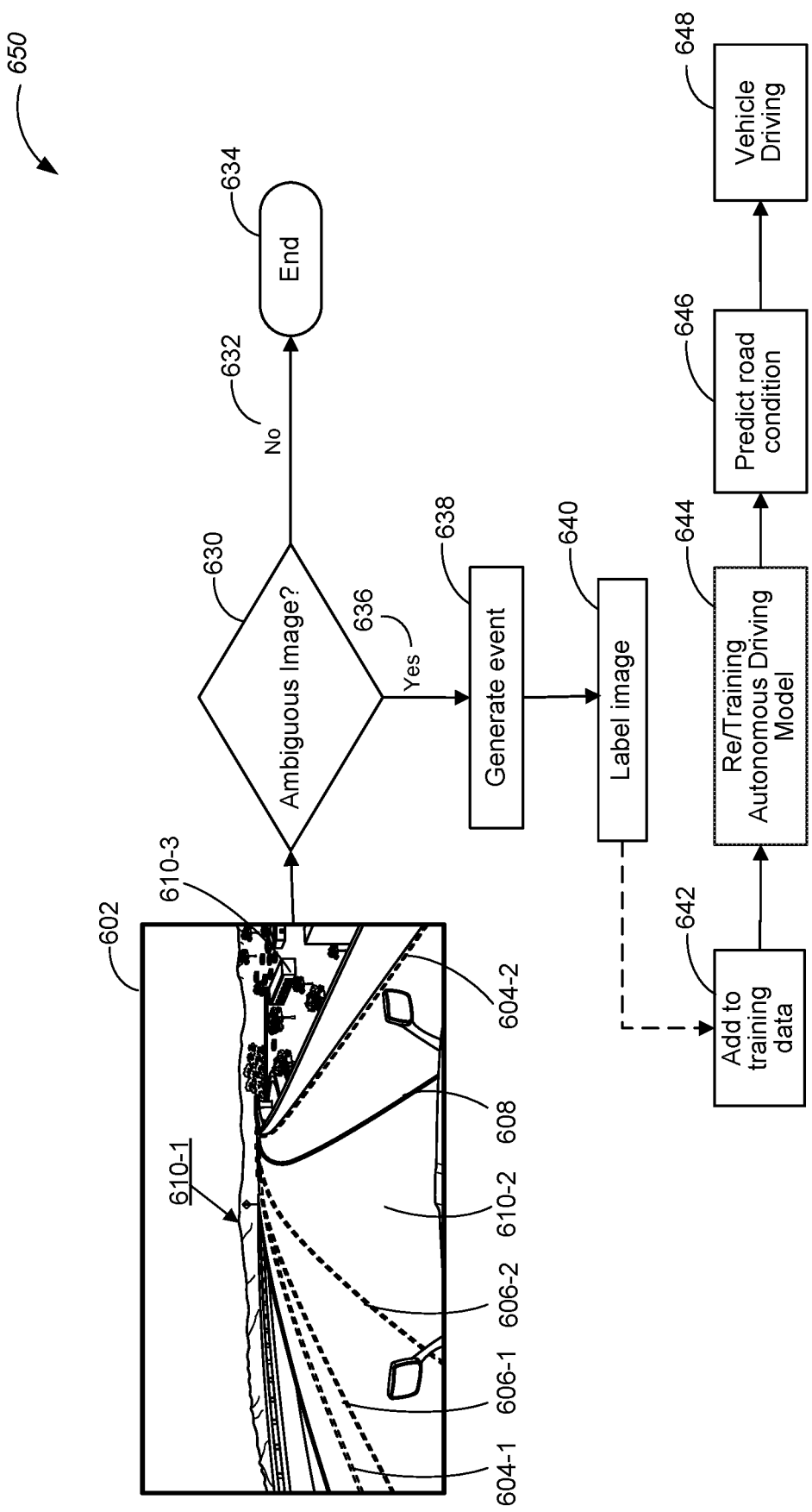
FIG. 6B is a flow diagram of an exemplary process of processing an ambiguous image, in accordance with some embodiments.

FIG. 6B is a flow diagram of an exemplary process 650 of processing an ambiguous image (e.g., a road image 602), in accordance with some embodiments. Operations described in the process 600 are performed by a computer system (e.g., a computer system located on vehicles 102, one or more servers 104, one or more client devices 108, or a combination thereof). The computer system includes one or more processors (e.g., CPU(s) 202 or CPU(s) 302) and memory (e.g., memory 206 or memory 306). The computer system optionally includes an event miner configured to detect (630) whether a road image is an ambiguous image for lane marker classification.

In some embodiments, the computer system generates (638) an event in accordance with the determination that the road image 602 is an ambiguous image for lane marker classification (step 636), e.g., based on a ratio between the ambiguous lane pixel count ALP and total lane pixel count TLP as described above for FIG. 6A. In an example, the computer system adds a tag to the road image 602, to indicate that the road image 602 is an ambiguous image for lane marker classification. In some embodiments, the road image 602 includes an image frame of a video stream (e.g., live stream) captured by a vehicle 102. The computer system sends a request to the vehicle 102 to record and save the image 602 in local memory. Alternatively, in some embodiments, in accordance with a determination that the road image 602 is not (632) an ambiguous image, e.g., based on a ratio between the ambiguous lane pixel count ALP and total lane pixel count TLP, the process 650 ends (634), and the computer system does not generate an event.

In some embodiments, the road image 602 is then labeled (640). In some embodiments, the labeled image includes information (e.g., metadata) identifying one or more lane markers (e.g., locations of the lane markers) in the respective labeled image. In some embodiments, the labeled image includes information identifying one or more lanes in the respective labeled image (e.g., based on the locations of the one or more lane markers). Further, in some embodiments, the computer system adds (642) the labeled image to the training data 248 (FIGS. 2 and 3) for training and retraining (644) the autonomous driving model 252 (FIG. 2). In an example, the autonomous driving model 252 (FIG. 2) is applied (e.g., locally) to predict a road condition 646, allowing the vehicle 102 to be adjusted, controlled, or driven (648) adaptively and/or at least partially autonomously. The information identifying the one or more lanes is optionally applied as ground truth for training or retraining the autonomous driving model 252 (FIG. 2).

Figure 7A:
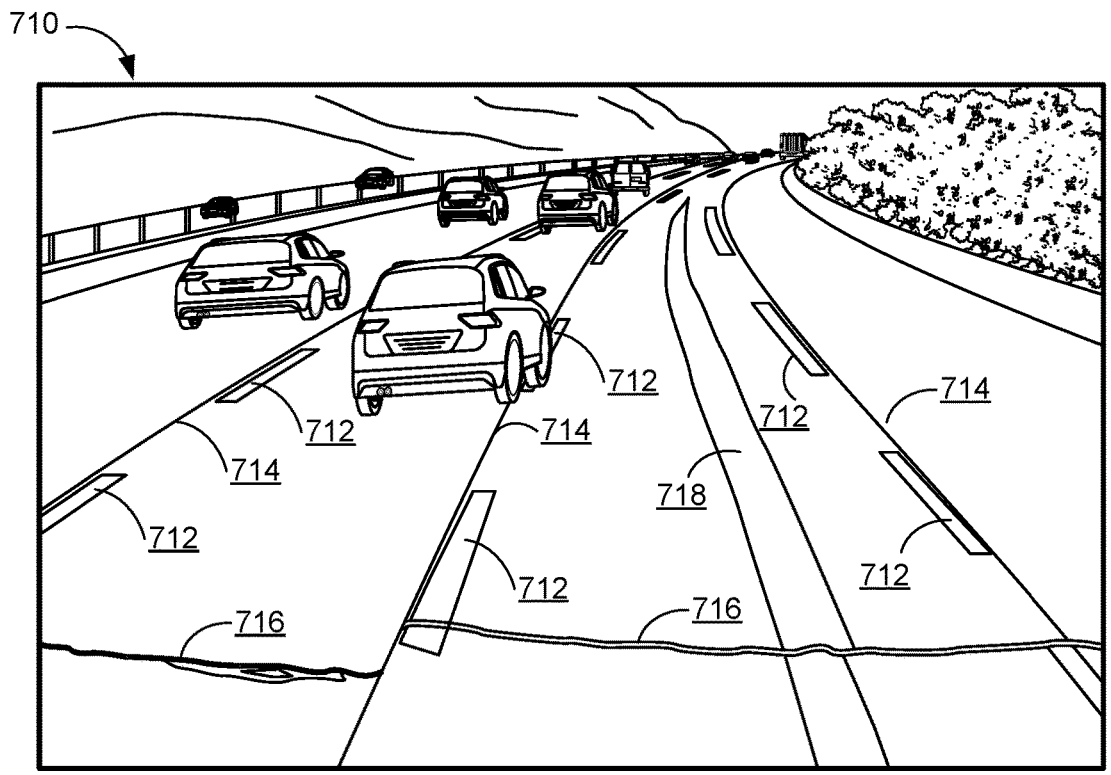
FIGS. 7A to 7F are exemplary road images that have been identified as ambiguous images for lane marker classification, in accordance with some embodiments.
Figure 7B:
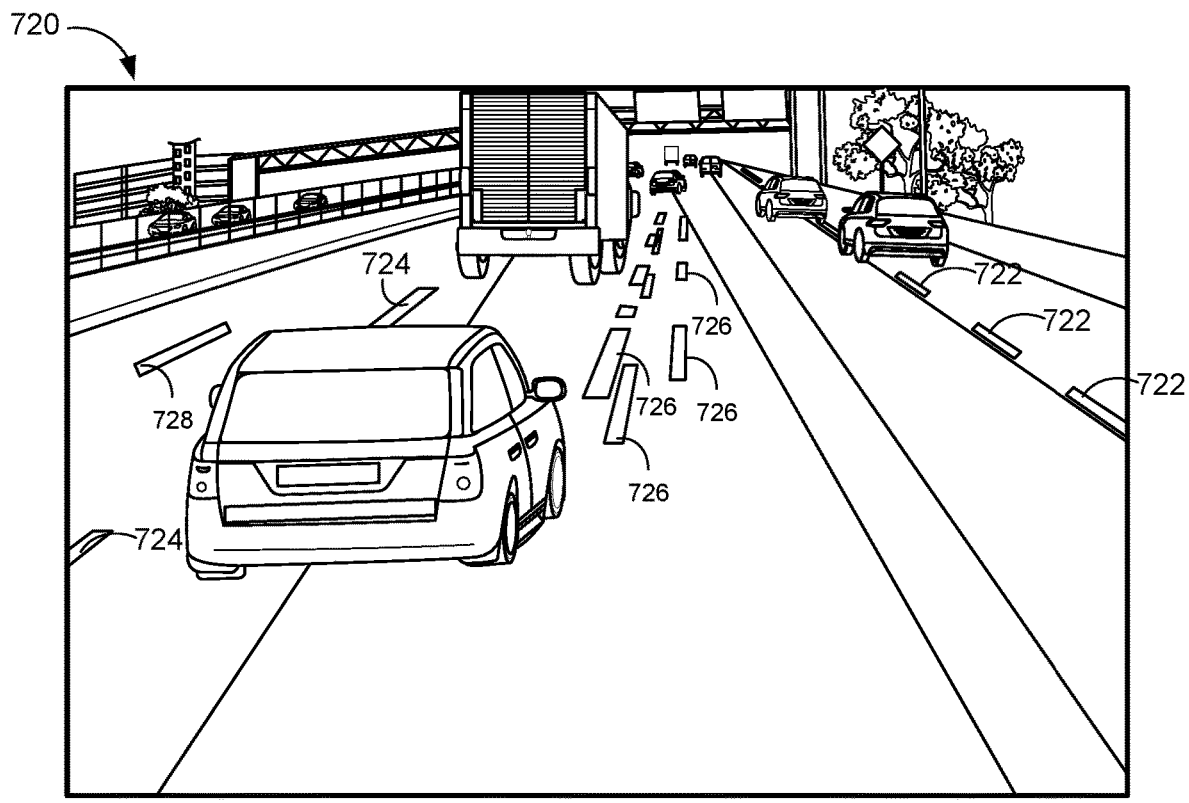
Figure 7C:
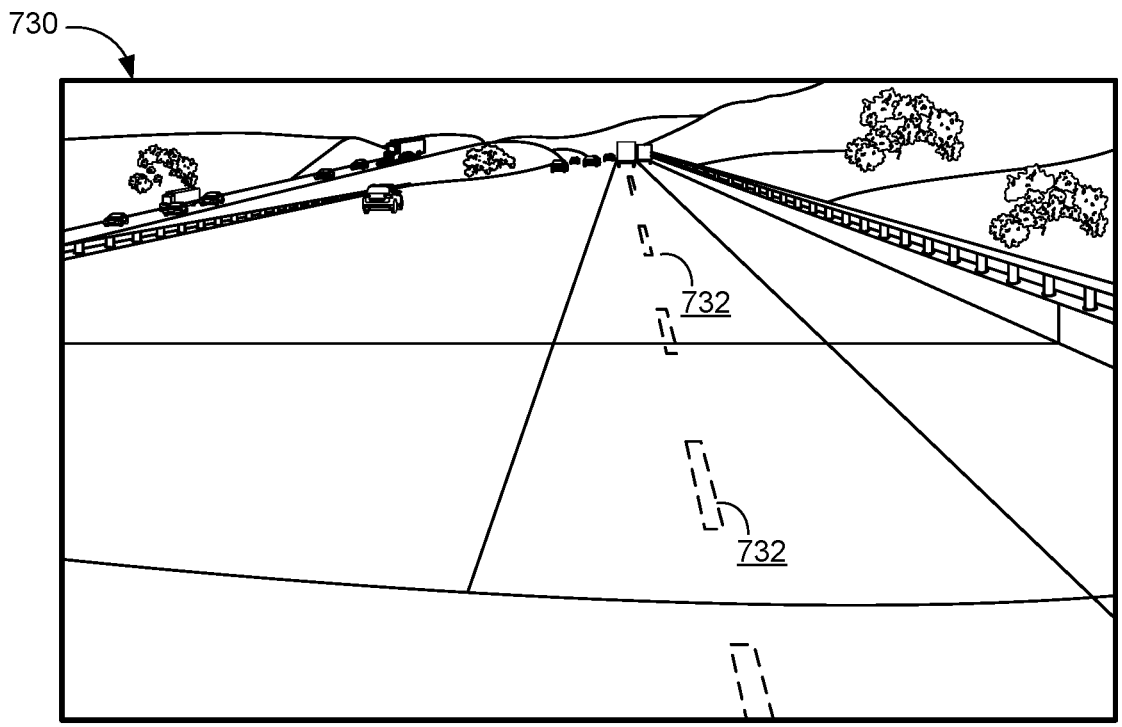
Figure 7D:
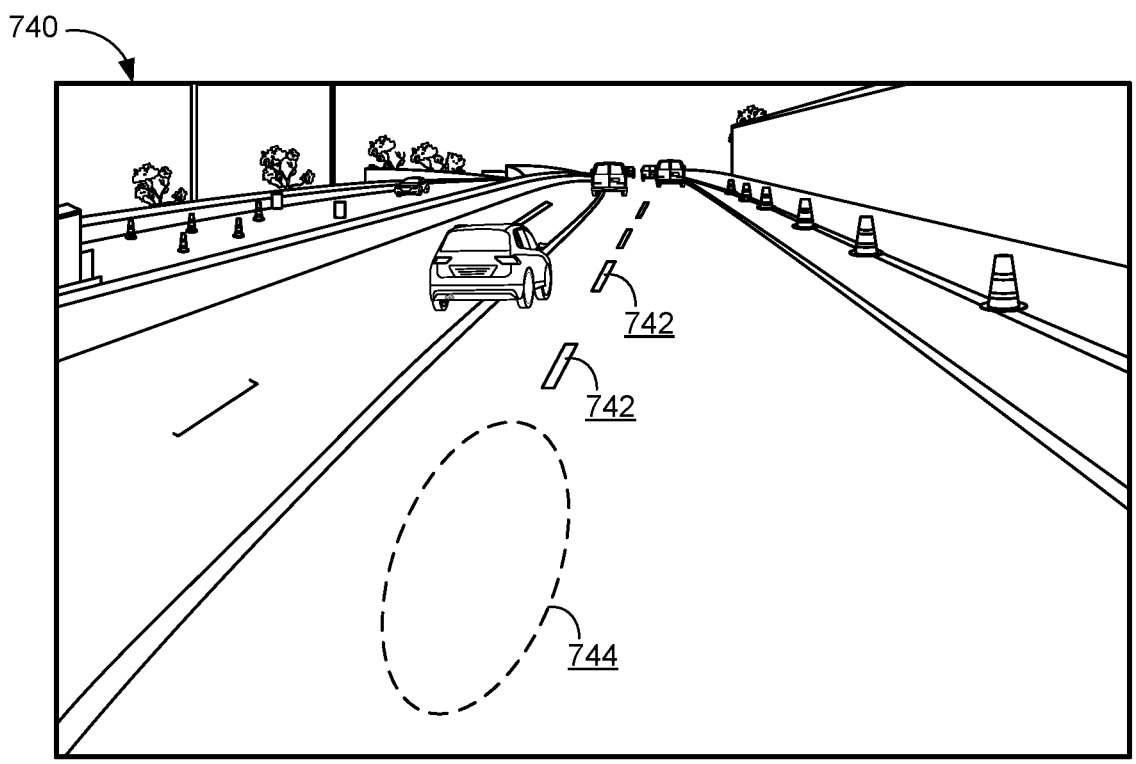
Figure 7E:
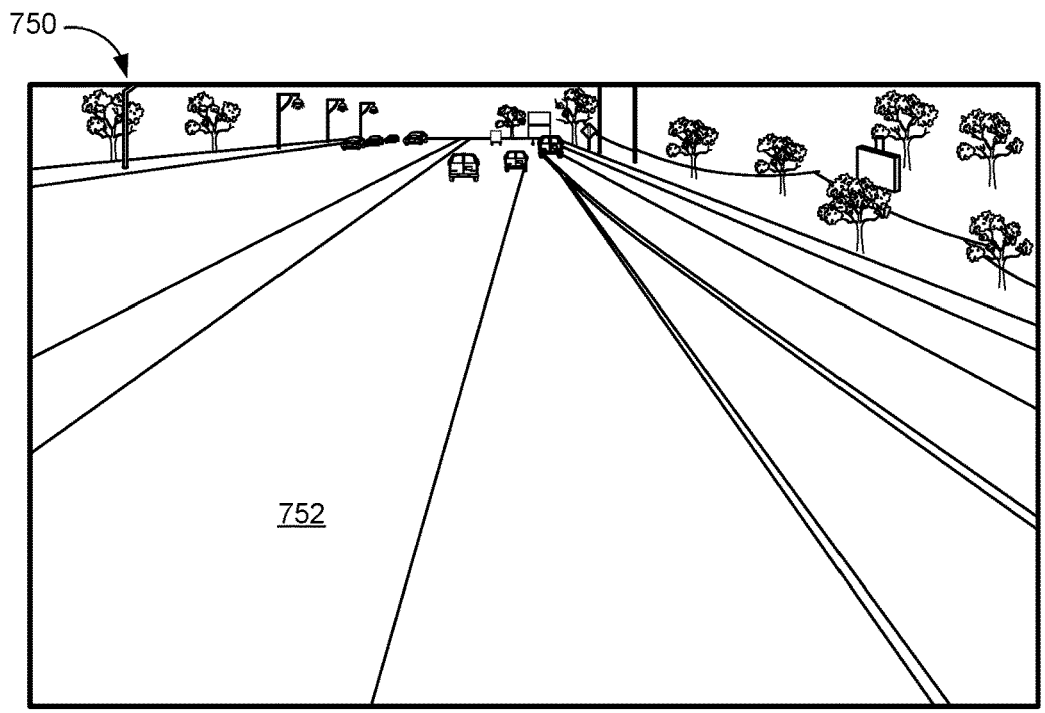
Figure 7F:
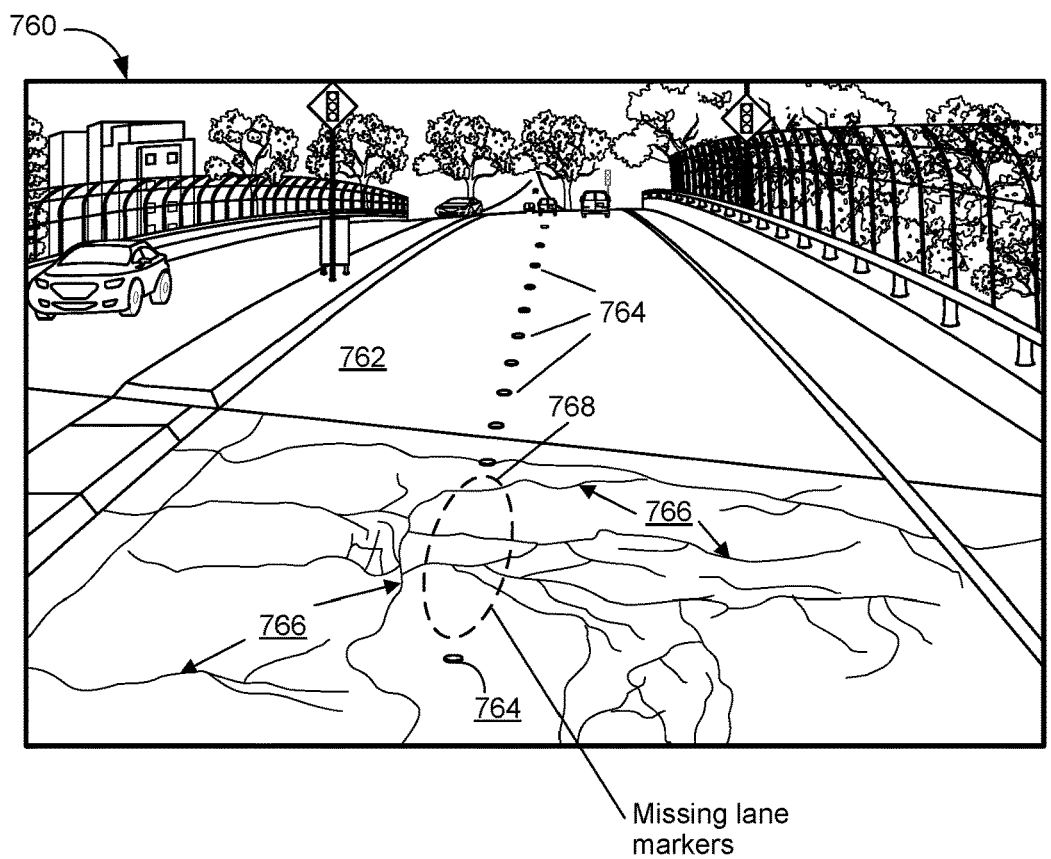

FIGS. 7A to 7F are exemplary images (e.g., road images) 710, 720, 730, 740, 750, and 760 that have been identified as ambiguous images for lane marker classification, in accordance with some embodiments. Referring to FIG. 7A, a plurality of vehicles 102 are driving on a road. The road includes lanes that are defined by dashed lane markers 712. The image 710 shows that the road has longitudinal cracks 714 and transverse cracks 716. The longitudinal cracks 714 extend in parallel with a direction of travel of the vehicles 102, and the transverse cracks 716 extend cross the road, i.e., in a direction that is substantially perpendicular to the direction of travel). The image 710 also shows that a surface of the road has deteriorated and appears differently at an area 718. Referring to FIG. 7B, the image 720 includes two sets of lane markers 722 and 724 that have been clearly marked on a road with white paint. However, additional lane markers 726 and 728 are also observed on the road. These additional lane markers 726 and 728 correspond to traces left on the road after previous markers were not properly removed by a road crew. Referring to FIG. 7C, an image 730 of a road includes lane markers 732 that have faded or worn out, e.g., due to wear and tear over time. Referring to FIG. 7D, an image 740 of a road includes a set of lane markers 742 and a region 744 in which lane markers extended from the lane markers 742 are missing. Referring to FIG. 7E, an image 750 of a road 752 captured by one or more cameras 266 of a vehicle 102 at night. Due to lighting conditions or wear and tear of the road 752, lane markers of the road 752 are not visible on the image 750, regardless of whether these lane markers are present or not. Referring to FIG. 7F, the image 760 includes a road 762 having a series of lane markers 764 extending in parallel with a direction of travel of a vehicle 102. The lane markers 764 intersect with a region 768 where lane markers are missing due to destruction (e.g., cracks 766) on a corresponding road surface.

When road images captured by cameras 266 of a vehicle 102 are applied for model training or vehicle control, situations can occur where road markers on the road images are not recognized for different reasons (e.g., bad road conditions, poor image quality, poor ambient light conditions). Some road markers may be missing on the images. Some road markers appear on a drivable area by mistake. Some road markers are not sufficiently clear and cannot be recognized by the data processing model 250 (FIG. 2). Some road markers are not clear (e.g., have noise) and cannot be recognized by the data processing model 250. As explained above, the computer system determines (630) whether each image in FIGS. 7A-7F is an ambiguous image for lane marker classification based on a plurality of probability 612 of each pixel corresponding to a plurality of lane marker classes 606-610. By these means, the computer system monitors a level of missing, erroneous, or noisy land marker features, and train or apply the data processing model 250 adaptively based on the monitored level.

Figure 8A:
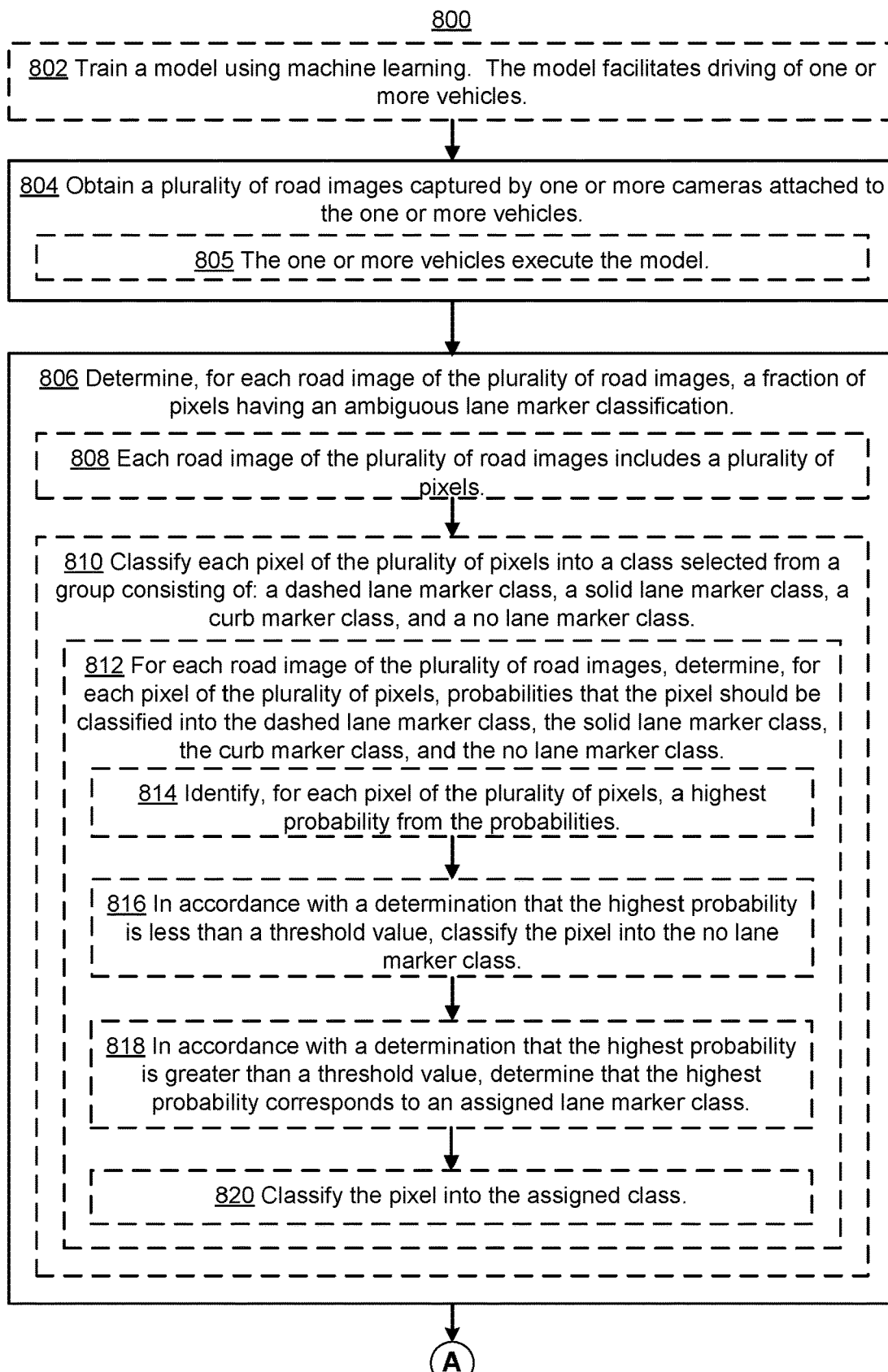

FIGS. 8A to 8C are a flow diagram of a method 800 for lane marker (e.g., road marker) detection for driving a vehicle, in accordance with some embodiments. The method 800 is performed at a computer system that has one or more processors (e.g., CPU(s) 202 or CPU(s) 302) and memory (e.g., memory 206 or memory 306) (FIGS. 2 and 3). The memory stores one or more programs configured for execution by the one or more processors. In some embodiments, the operations shown in FIGS. 8A-8C correspond to instructions stored in the memory or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 800 may be combined and/or the order of some operations may be changed.

The computer system obtains (804) a plurality of road images captured by one or more cameras attached to the one or more vehicles 102. The one or more vehicles 102 execute (805) a model (that facilitates driving of the one or more vehicles 102). For each road image of the plurality of road images (e.g., road image 602 in FIG. 6A), the computer system determines (806) a fraction (e.g., ratio) of pixels having an ambiguous lane marker classification in the road image and determines (822) whether the road image is an ambiguous image for lane marker classification based on the fraction of pixels. For each road image, in accordance with a determination that the road image is an ambiguous image for lane marker classification, the computer system enables (842) labeling of the road image and adds (842) the labeled image into a corpus of training images for retraining the model.

In some embodiments, the computer system trains (802) the model using machine learning. The model facilitates driving of one or more vehicles 102. In some embodiments, the model includes a vehicle data processing model 250 (e.g., an autonomous driving model 252). Each vehicle data processing model 250 is trained to process corresponding vehicle data to implement a respective one of a plurality of vehicle tasks including, but not limited to, perception and object analysis 230, vehicle localization and environment mapping 232, vehicle drive control 234, vehicle drive planning 236, local operation monitoring 238, and vehicle driving behavior monitoring 240 (FIG. 2).

Referring to FIG. 8A, in some embodiments, for each road image of the plurality of road images, the respective road image includes (808) a plurality of pixels. Determining the fraction of pixels having an ambiguous lane marker classification includes classifying (810) each pixel of the plurality of pixels into a class (e.g., lane marker class)

selected from a group consisting of: a dashed lane marker class 606, a solid lane marker class 608, a curb marker class 604, and a no lane marker class 610. As used herein, a lane includes the road surface between the lane markers (or lane lines). A curb marker class 604 is a class of lane that depicts where a road surface ends. In some embodiments, the "no lane marker" class 610 includes everything in the image except a solid lane marker 608, a dashed lane marker 606, and a curb 604. For example, a captured image can include the sky, or surrounding trees. Image pixels corresponding to these objects have the "no lane marker" classification.

In some embodiments, the computer device applies a classification neural network to classify each pixel of the plurality of pixels of the road image to a respective road marker class (e.g., including, for each pixel, determining a plurality of probabilities associated with a plurality of lane marker classes). The classification neural network optionally includes a CNN (e.g., a fully convolutional network (FCN)). Optionally, the CNN has a kernel size of 3×3. In an example, the CNN of the classification neural network has an effective receptive field (ERF). In some embodiments, the classification neural network includes one of a U-Net (i.e., a symmetric encoder-decoder network), a pyramid scene parsing network, and a multi-path refinement network.

In some embodiments, the classifying includes, for each road image of the plurality of road images, the computer system determines (812), for each pixel of the plurality of pixels, probabilities 612 (e.g., confidences or likelihoods) that the pixel should be classified into the dashed lane marker class 606, the solid lane marker class 608, the curb marker class 604, and the no lane marker class 610 (FIG. 6). In some embodiments, the respective probability has a value from 0 to 1, and the sum of the probabilities for each pixel equals to 1.

Referring to FIG. 8A, in some embodiments, the computer system identifies (814), for each pixel of the plurality of pixels of a road image, a highest probability $P_H$ from the probabilities 612. In some embodiments, in accordance with a determination that the highest probability $P_H$ is less than a threshold value (e.g., $P_{iTH}$ in FIG. 6A) (e.g., 0.7, 0.75, or 0.8), the computer system classifies (816) the pixel into the no lane marker class 610. For example, the plurality of pixels include a pixel whose probabilities are P(no lane marker)=0.2, P(solid lane marker)=0.1, P(dashed lane marker)=0.6, and P(curb)=0.1, and the threshold value is 0.7. In this example, even though the dashed lane marker class has the highest probability, the computer system assigns the pixel as belonging to the "no lane marker" class because its probability value (0.6) is less than the threshold value of 0.7.

In some embodiments, in accordance with a determination that the highest probability $P_H$ is greater (e.g., or at least equal to) than a threshold value (e.g., 0.7, 0.75, or 0.8), the computer system determines (818) that the highest probability $P_H$ corresponds to an assigned lane marker class, and classifies (820) the pixel into the assigned lane marker class. For example, the plurality of pixels include a pixel whose probabilities are P(no lane marker)=0.1, P(solid lane marker)=0.8, P(dashed lane marker)=0.05, and P(curb)=0.05, and the threshold value is 0.7. In this example, the solid lane marker class 608 has the highest probability $P_H$. The computer system assigns the pixel as belonging to the "solid lane marker" class 608 because its probability value (0.8) is greater (or at least equal to) the threshold value of 0.7.

With continued reference to FIG. 8B, the computer system determines (822), for each road image of the plurality of road images, based on the fraction of pixels, whether the road image is an ambiguous image for lane marker classification. In some embodiments, determining the fraction of pixels having an ambiguous lane marker classification includes initializing (824) (e.g., setting) a total lane pixel count TLP to zero. In some embodiments, determining the fraction of pixels having an ambiguous lane marker classification includes initializing (826) an ambiguous lane pixel count ALP to zero.

In some embodiments, the computer system determines (828), for each pixel of the plurality of pixels in the respective road image, a class that has a highest probability $P_H$.

In some embodiments, in accordance with a determination that the class that has the highest probability ($P_H$) belongs (830) to a predefined subset of the classes, the computer system increments a total lane pixel count TLP (e.g., by one).

In some embodiments, the predefined subset of classes includes (832) the dashed lane marker class, the solid lane marker class, and the curb marker class.

In some embodiments, in accordance with a determination that the highest probability is within a predetermined range of values from a first threshold value (e.g., 0.7, 0.75, or 0.8), the computer system increments (834) the ambiguous lane pixel count ALP (e.g., by one). For example, the predetermined range of values can be defined by [first threshold value minus delta, first threshold value plus delta], where delta is, e.g., 0.05 or 0.1.

In some embodiments, for each pixel of the plurality of pixels in the respective road image, in accordance with a determination that the class that has the highest probability belongs to a predefined subset of the classes, the computer system ignores (836) the pixel if the highest probability does not meet the first threshold value (e.g., 0.7, 0.75. or 0.8).

In some embodiments, the computer system determines (838) a ratio (e.g., fraction) of the ambiguous lane pixel count ALP to the total lane pixel count TLP.

In some embodiments, in accordance with a determination that the ratio is above (or at least equal to) a second threshold value (e.g., 0.2 or 0.3), the computer system determines (840) that the road image is an ambiguous image for lane marker classification.

With continued reference to FIG. 8C, the method 800 includes, for each road image of the plurality of road images, in accordance with a determination that the road image is an ambiguous image for lane marker classification, the image is labeled (842) (e.g., by a human). The computer system adds the labeled image into a corpus of training images for re/training the model.

In some embodiments, the image is an ambiguous image for lane marker classification when the image does not clearly depict that there is no lane marker. In some embodiments, an image is an ambiguous image for lane marker classification when the image does not clearly depict that there are lane markers. This is illustrated in FIGS. 7A to 7F.

In some embodiments, the image is an ambiguous image when the image does not clearly depict where the lane lines are, or what type of marker/line (e.g., a lane marker, such as dashed, solid, curb line, certain color lane marker, etc.) the lane line is. This is illustrated in FIGS. 7A to 7F.

In some embodiments, enabling labeling of the image includes receiving (844) user input for the labeling.

In some embodiments, the computer system retrains the model using (846) machine learning.

In some embodiments, the model includes (848) an autonomous driving model (e.g., autonomous driving model 252). Retraining the model includes modifying the autonomous driving model based at least in part on the added labeled images (e.g., and the ambiguous image) such that the one or more vehicles 102 can be driven at least partially autonomously using the autonomous driving model.

In some embodiments, each labeled image includes (850) information identifying one or more lane markers (e.g., locations of the lane markers) in the respective labeled image; and/or information identifying one or more lanes in the respective labeled image (e.g., based on the locations of the one or more lane markers).

In some embodiments, the information identifying one or more lane markers includes ground truth of the ambiguous image, manually marked on the ambiguous image, so that the model better recognizes lane markers in future images that would otherwise be ambiguous images.

In some embodiments, adding the labeled image, corresponding to a respective road image, into the corpus of training images for retraining the model includes transmitting (852) the labeled image to a remote server to be added to the corpus of training images.

In some embodiments, after the retraining, the computer system distributes (854) the modified autonomous driving model to the one or more vehicles 102, including a first vehicle. The modified autonomous driving model is configured to process road images captured by the first vehicle to facilitate at least partially autonomously driving the first vehicle.

In some embodiments, the road images are captured by the first vehicle in real time.

In some embodiments, the road images are captured by the first vehicle automatically and without user intervention.

In some embodiments, the autonomous driving model is configured to modify an autonomous driving variable based on the road images captured by the first vehicle. In some embodiments, modifying an autonomous driving variable includes discarding (e.g., ignoring) the road images. In some embodiments, modifying an autonomous driving variable includes using another model, such as following a vehicle that is in front.

It should be understood that the particular order in which the operations in FIGS. 8A-8C have been described are merely exemplary and are not intended to indicate that the described order is the only order in which the operations could be performed. One of ordinary skill in the art would recognize various ways to perform lane marker detection for vehicle driving as described herein. Additionally, it should be noted that details described above with respect to FIGS. 1-7 are also applicable in an analogous manner to the method 800 described above with respect to FIGS. 8A-8C. For brevity, these details are not repeated here.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., according to a communication protocol). In this manner, computer-readable media generally may correspond to (1) tangible computer-readable storage media which is non-transitory or (2) a communication medium, such as a signal or carrier wave. Data storage media may be any available media that can be accessed by one or more computers or one or more processors to retrieve instructions, code and/or data structures for implementation of the embodiments described in the present application. A computer program product may include a computer-readable medium.

The terminology used in the description of the embodiments herein is for the purpose of describing particular embodiments only and is not intended to limit the scope of claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first and second may be used herein to describe various elements, these elements should not be limited by these terms. These terms are only used to distinguish one element from another. For example, a first vehicle could be termed a second vehicle, and, similarly, a second vehicle could be termed a first vehicle, without departing from the scope of the embodiments. The first vehicle and the second vehicle are both vehicles 102, but they are not the same vehicle.

The description of the present application has been presented for purposes of illustration and description, and is not intended to be exhaustive or limited to the invention in the form disclosed. Many modifications, variations, and alternative embodiments will be apparent to those of ordinary skill in the art having the benefit of the teachings presented in the foregoing descriptions and the associated drawings. The embodiments are described in order to best explain the principles of the invention, the practical application, and to enable others skilled in the art to understand the invention for various embodiments and to best utilize the underlying principles and various embodiments with various modifications as are suited to the particular use contemplated. Therefore, the scope of the claims is not to be limited to the specific examples of the embodiments disclosed. Modifications and other embodiments are intended to be included within the scope of the appended claims.

What is claimed is:

1. A method for lane marker detection for vehicle driving, comprising:
at a computer system including one or more processors and memory:
obtaining a road image captured by a vehicle, the road image having a plurality of regions;
determining, in the road image, a fraction of the plurality of regions having an ambiguous lane marker classification;
determining whether the road image is ambiguous for lane marker classification based on the fraction;
in accordance with a determination that the road image is ambiguous for lane marker classification, facilitating labeling of the road image to identify any lane markers in the road image to no longer be ambiguous;
retraining a model to generate a retrained model; and
distributing the retrained model to one or more vehicles, wherein the retrained model is configured to process road images captured by the one or more vehicles to facilitate at least partially autonomously driving the one or more vehicles.

2. The method of claim 1, wherein:
the model comprises an autonomous driving model; and
retraining the model includes modifying the autonomous driving model based at least in part on labelling of the road image such that the one or more vehicles can be driven at least partially autonomously using the autonomous driving model.

3. The method of claim 1, further comprising:
prior to the obtaining, training the model using machine learning based on one or more training images that are distinct from the road image; and
retraining the model using machine learning.

4. The method of claim 1, wherein facilitating labeling of the road image includes receiving user input for the labeling.

5. The method of claim 1, wherein facilitating labeling of the road image includes enabling generation of a labeled road image including:
information identifying one or more lane markers in the labeled road image; and/or
information identifying one or more lanes in the labeled road image.

6. The method of claim 1, wherein determining the fraction of the plurality of regions having the ambiguous lane marker classification includes classifying each region of the plurality of regions to have a respective lane marker classification from a plurality of lane marker classifications.

7. The method of claim 6, wherein for each region of the plurality of regions, the respective lane marker classification is selected from a group consisting of: a dashed lane marker class, a solid lane marker class, a curb marker class, and a no lane marker class.

8. The method of claim 6, wherein the classifying further comprises:
determining, for each respective region of the plurality of regions, probabilities that the respective region should be classified into the plurality of lane marker classifications.

9. The method of claim 8, further comprising:
identifying, for each region of the plurality of regions, a highest probability from the probabilities; and
in accordance with a determination that the highest probability is less than a threshold value, classifying the region into a no lane marker class.

10. The method of claim 8, wherein the classifying further comprises:
for each region of the plurality of regions in the road image:
identifying a highest probability from the probabilities; and
in accordance with a determination that the highest probability is greater than a threshold value:
determining that the highest probability corresponds to an assigned class; and
classifying the respective region into the assigned class.

11. The method of claim 8, further comprising:
for each region of the plurality of regions in the road image:
determining a class that has a highest probability;
in accordance with a determination that the class that has the highest probability belongs to a predefined subset of classes, incrementing a total lane pixel count; and
in accordance with a determination that the highest probability is within a predetermined range of values from a first threshold value, incrementing an ambiguous lane pixel count;
determining a ratio of the ambiguous lane pixel count to the total lane pixel count; and
in accordance with a determination that the ratio is above a second threshold value, determining that the road image is ambiguous for lane marker classification.

12. The method of claim 11, further comprising:
for each region of the plurality of regions in the road image:
in accordance with the determination that the class that has the highest probability belongs to the predefined subset of classes, ignoring the respective region if the highest probability does not meet the first threshold value.

13. The method of claim 11, wherein the predefined subset of classes includes: a dashed lane marker class, a solid lane marker class, and a curb marker class.

14. A computer system, comprising:
one or more processors; and
memory storing one or more programs configured for execution by the one or more processors, the one or more programs comprising instructions for:
obtaining a road image captured by a vehicle, the road image having a plurality of regions;
determining, in the road image, a fraction of the plurality of regions having an ambiguous lane marker classification;
determining whether the road image is ambiguous for lane marker classification based on the fraction;
in accordance with a determination that the road image is ambiguous for lane marker classification, facilitating labeling of the road image to identify any lane markers in the road image to no longer be ambiguous;
retraining a model to generate a retrained model; and
distributing the retrained model to one or more vehicles, wherein the retrained model is configured to process road images captured by the one or more vehicles to facilitate at least partially autonomously driving the one or more vehicles.

15. The computer system of claim 14, wherein the one or more vehicles includes the vehicle that captures the road image.

16. The computer system of claim 14, wherein the plurality of regions include a subset of regions, and each of the subset of regions includes only a respective single pixel.

17. A non-transitory computer-readable storage medium storing one or more programs configured for execution by one or more processors of a computer system, the one or more programs comprising instructions for: obtaining a road image captured by a vehicle, the road image having a plurality of regions;
determining, in the road image, a fraction of the plurality of regions having an ambiguous lane marker classification;
determining whether the road image is ambiguous for lane marker classification based on the fraction;
in accordance with a determination that the road image is ambiguous for lane marker classification, facilitating labeling of the road image to identify any lane markers in the road image to no longer be ambiguous;
retraining a model to generate a retrained model; and
distributing the retrained model to one or more vehicles, wherein the retrained model is configured to process road images captured by the one or more vehicles to facilitate at least partially autonomously driving the one or more vehicles.

18. The non-transitory computer-readable storage medium of claim 17, the one or more programs further comprising instructions for:
adding a labeled road image, corresponding to the road image, into a corpus of training images for retraining the model, including transmitting the labeled road image to a remote server to be added to the corpus of training images.

19. The non-transitory computer-readable storage medium of claim 17, determining whether each respective region of the plurality of regions of the road image has the ambiguous lane marker classification further comprising:
determining a set of probabilities of classifying each respective region into a plurality of predefined classes, wherein whether each region of the plurality of regions of the road image has the ambiguous lane marker classification is determined based on values of the set of probabilities of the respective region.

20. The non-transitory computer-readable storage medium of claim 17, wherein determining whether the road image is ambiguous for lane marker classification further includes comparing the fraction with a threshold fraction.

* * * * *